Fig. 5

| MCS | tx | ty |
|-----|-----|-----|
| R4 | C3 | C9 |
| R7 | (C3) | C6 |

*Fig. 6.*

| MCS | tx | ty |
|-----|-----|-----|
| R8 | (C6) | C4 |
| R10 | C6 | C8 |

*Fig. 7.*

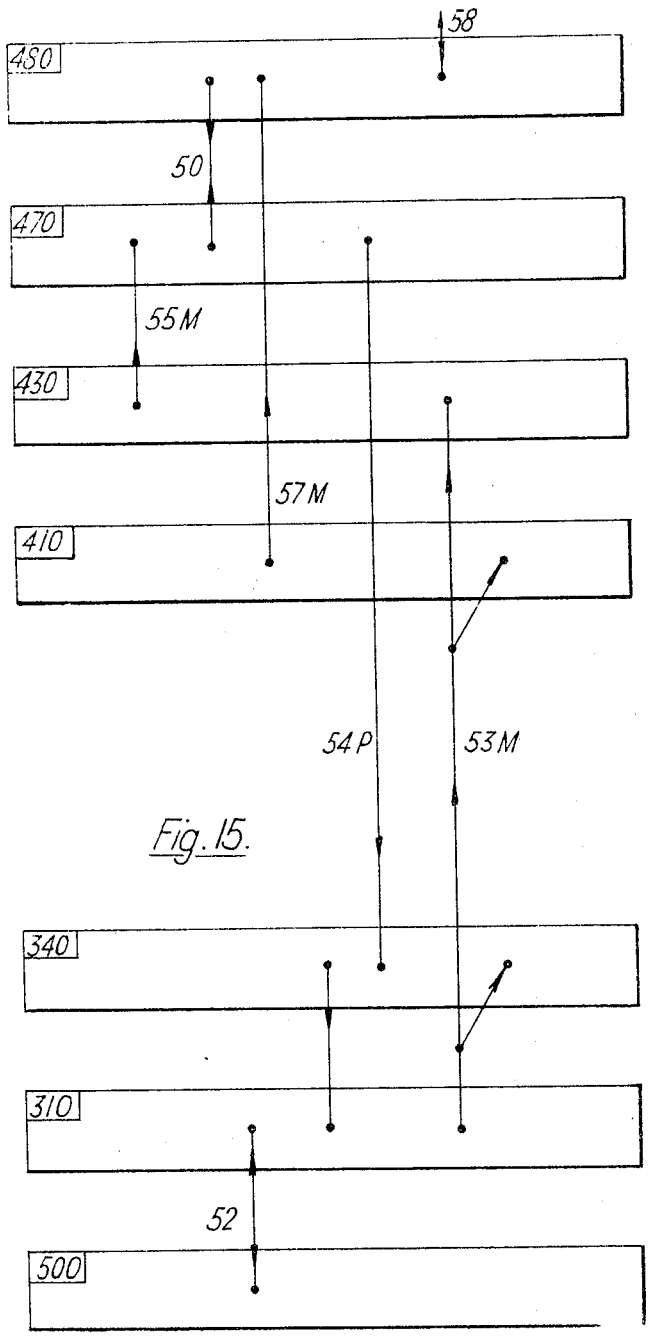

United States Patent Office 3,281,537
Patented Oct. 25, 1966

3,281,537
MULTIPLEX SWITCHING STAGE AND ITS ASSOCIATED CONTROL CIRCUITS
Jacques Georges Dupieux, Issy-les-Moulineaux, Jean Pierre Le Corre, Sainte-Genevieve-des-Bois, and Pierre Seneque, Palaiseau, France, assignors to International Standard Electric Corporation
Filed Oct. 11, 1962, Ser. No. 229,902
Claims priority, application France, Nov. 3, 1961, 877,865, Patent 1,313,830
11 Claims. (Cl. 179—15)

The present invention concerns a switching stage between time division multiplex trunks and the associated control circuits enabling the selective setting up of connections between the channels of the said multiplex trunks.

Generally, the word "multiplex line" will designate a transmission channel on which several communications are simultaneously transmitted in one single direction.

In the time division systems, the $m$ informations which are present in analog form in a "transmitting exchange" and which have to be transmitted simultaneously on the line towards a "receiving exchange" are sampled once at each frame period. In the system described a frame period of 100 $\mu$s. has been chosen by way of a non limitative example.

The amplitude modulated pulses obtained by means of this sampling are quantified and coded in one of the known binary codes and the $m$ codes or "messages" are transmitted in time succession during a frame period.

If one chooses $m=25$, a time slot of 4 $\mu$s. is attributed to each channel. It will be noted that the word "channel" involves the idea of relative position with respect to an origin which is materialized by a synchronization code transmitted on the 25th channel.

The receiving exchange comprises a clock which supplies time slot signals referenced $t1$ to $t25$, each one having a duration of 4 $\mu$s. The time slot defined by each one of these signals will be called "channel time slot." In the example under consideration, one chooses a 7 digit non-redundant binary code and an 8th digit is added to this number which has usually the value 1 but, since it has no meaning at all in the message, it is cancelled inside the switching stage.

The "digit time slot" assigned to each one of these eight figures is thus 500 ns. (abbreviation of nanosecond=$10^{-9}$ second).

Each digit time slot is subdivided into 4 equal "basic time slots" of a duration of 125 ns. which are respectively referenced $a, b, c, d$.

The digit time slots will be referenced 1 to 8 and the basic time slot $b$ of the digit time slot 3 of the channel time slot $t12$ will be referenced $t12.3b$. Since the digits are transmitted in such a channel the most significant one first, the digit time slot 1 corresponds to this latter, the digit time slot 2 to the next less significant digit, etc.

On the other hand, the exchange clock supplies also "shifted channel time slot" signals $t'1$ to $t'25$. These signals are leading by 4 digit time slots with respect to the signals $t1$ to $t25$, so that their first digit time slot is the digit time slot 5 and their last one, the digit time slot 4. One has thus: $t12.4=t'12.4$; $t12.5=t'13.5$; $t12.8=t'13.8$; $t13.1=t'13.1$; $t13.5=t'14.5$, etc.

In time division multiplex transmission, the grouping of two multiplex lines forwarding the communications in both directions will be called "trunk."

In the study of the switching problems treated in a local exchange or in a transit exchange, a trunk which is particularized by the direction of propagation of the calls will be called "specialized trunk" and a trunk on which the calls can be transmitted in the two transmission directions will be called "non specialized trunk."

In the course of the description it will be assumed that the trunks used are non specialized trunks. The case of specialized trunks would be treated in the same way within the frame of the present invention.

The communications passing through a switch established in a matrix form, the trunks associated with a receiving exchange are connected to the rows and to the columns of said switch, the distribution being made according to the traffic requirements.

Further on, the trunks which are connected to the rows and to the columns of the switch will be respectively called "row trunks" and "column trunks." Since electronic gates are placed at each of the cross points between the rows and columns of the switch, a link consists in transferring data in a bidirectional way between a row trunk and a column trunk.

It will be admitted to select a cross point in the switch from an instruction written in a store located in a row trunk which will be called "space path store."

If one has $n1$ row trunks and $n2$ column trunks the matrix comprises $n1 \times n2$ cross points, there are $n1$ space path stores and each one of them enables the selection of a cross point out of $n2$.

One will consider a switch which has to set up connections between the channels of $n1$ row trunks, R1 to R$n1$, and the channels of $n2$ column trunks C1 to C$n2$, and comprising $n1 \times n2$ cross points materializing the $n1 \times n2$ different paths which may be established between the row trunks and the column trunks. If the smaller of the two numbers $n1$ and $n2$ is called $n$, the maximum number of connections which may be established through the switch during a frame period is $m \times n$, and the maximum number of connections during a given channel time slot is $n$.

Thus, during a channel time slot, the switch establishes at most $n$ communications simultaneously. In order that these communications should be carried out correctly it is obviously necessary that, during a given channel time slot each one of the inputs of the switch on the row side and on the column side transmits but one message since it is not possible, for instance, to transmit simultaneously two messages coming from the same row trunk towards one or two column trunks.

If one examines now the general case of traffic flow, it may be set, for instance, that during the channel time slot $t5$, $N(5)$ connections are set up through the switch, with $N(5)<n$. This means that at this channel time slot, a certain number of row trunks and column trunks may be free. In the same way, at the time slot $t6$, $N(6)$ connections are set up with $N(6)<n$, etc.

Let us suppose for instance the setting up of a new connection between the channel 8 of a row trunk JAE3 on which arrives the call and the channel 21 which is free in a column trunk JAS8. This connection may be set up a priori through the switch at any channel time slot provided, as it has been seen previously, that connections should not be set up from the two trunks considered at this channel time slot.

When the traffic in the exchange reaches a certain congestion, it is possible that there will be no common channel time slot which is available on both incoming and outgoing trunks. If so, the channel time slot marking circuit sends a busy signal indicating that the communication could not be set up. In this case, it is said that there is "internal blocking" i.e. that an access cannot be found to the free output (channel 21 of the trunk JAS8) through the switch.

A system of suppression of the internal blocking by rearrangement of the existing connections has been described in the U.S. Patent No. 3,049,593 "Switching systems between multiplex communication channels." This arrangement is always possible when a channel is available on the called trunk.

The device described in the present invention, is an improvement to the patent mentioned wherein a marking stage associated with the common control circuit controls the setting up of the connections in a switching stage.

The general expression "connection rearrangement" designates thus the succession of a certain number of elementary rearrangement operations, the aim of which is to set up, in a multiplex switching stage, a new connection although a free channel time slot common to the two trunks which have to be linked may not exist. The elements of the problem are the following:

The row trunk $Ro$ must be connected to the column trunk $Co$, in order to set up a connection ($Ro-Co$);

The calling channel ($\underline{Ro}-Co$) on the trunk $Ro$ and the channel ($Ro-\underline{Co}$) on the called trunk are known.

The invention will be particularly described with reference to the accompanying drawings in which:

FIGURE 5 shows the detail of the operations which take place in the switching stage and in the marking stage, under the control of the signals EII, AI and AII;

Figures 6, 7:
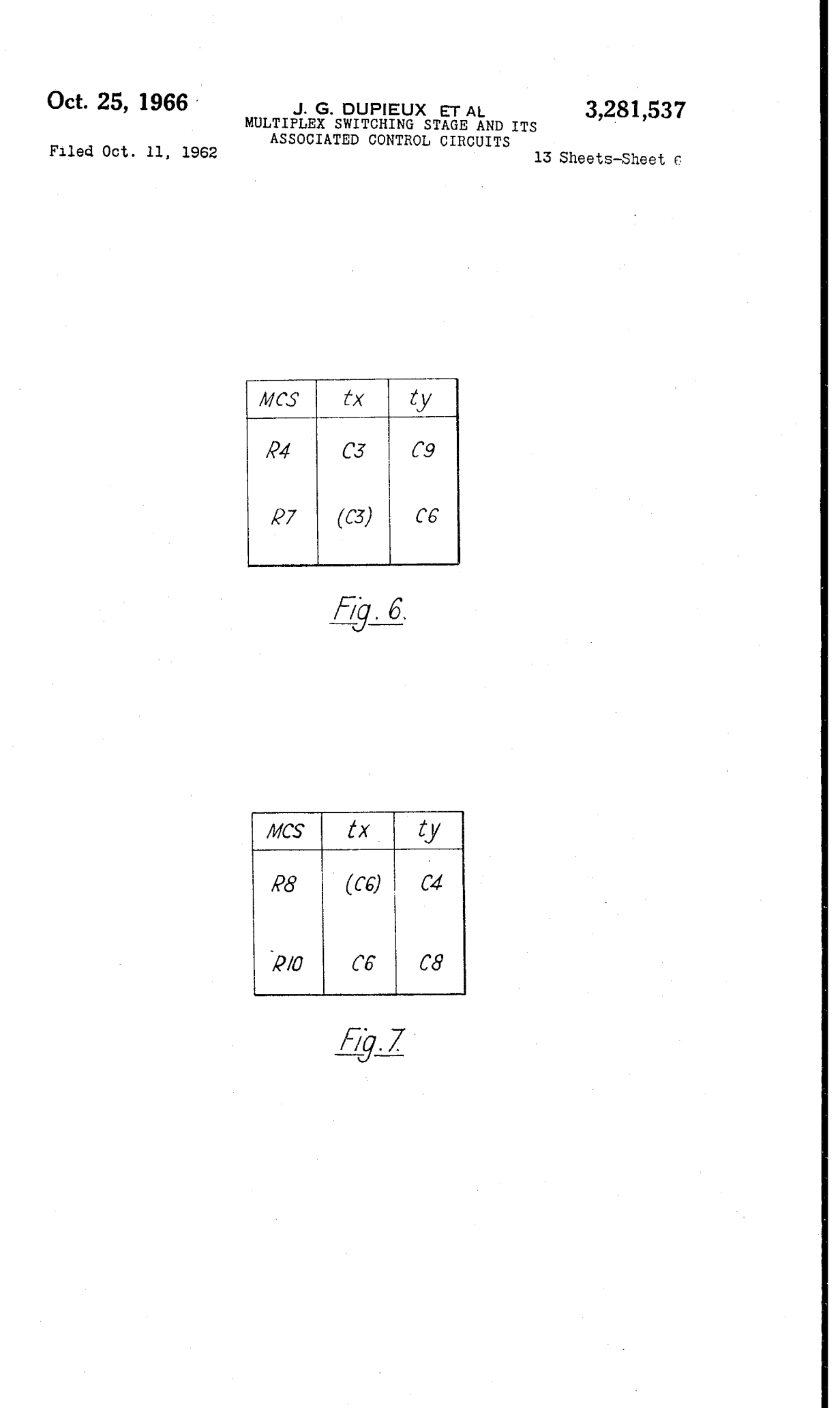

FIGURE 6 shows the codes stored on the lines $x$ and $y$ of two space path stores;

FIGURE 7 shows a special configuration of codes stored on the lines $x$ and $y$ of two space stores;

FIGURE 14 shows the assembly diagram of the FIGURES 2, 8, 9, 10, 11, 12 and 13;

FIGURE 15 shows a diagrammatic view of FIGURES 2, 10 and 13.

Figure 1:
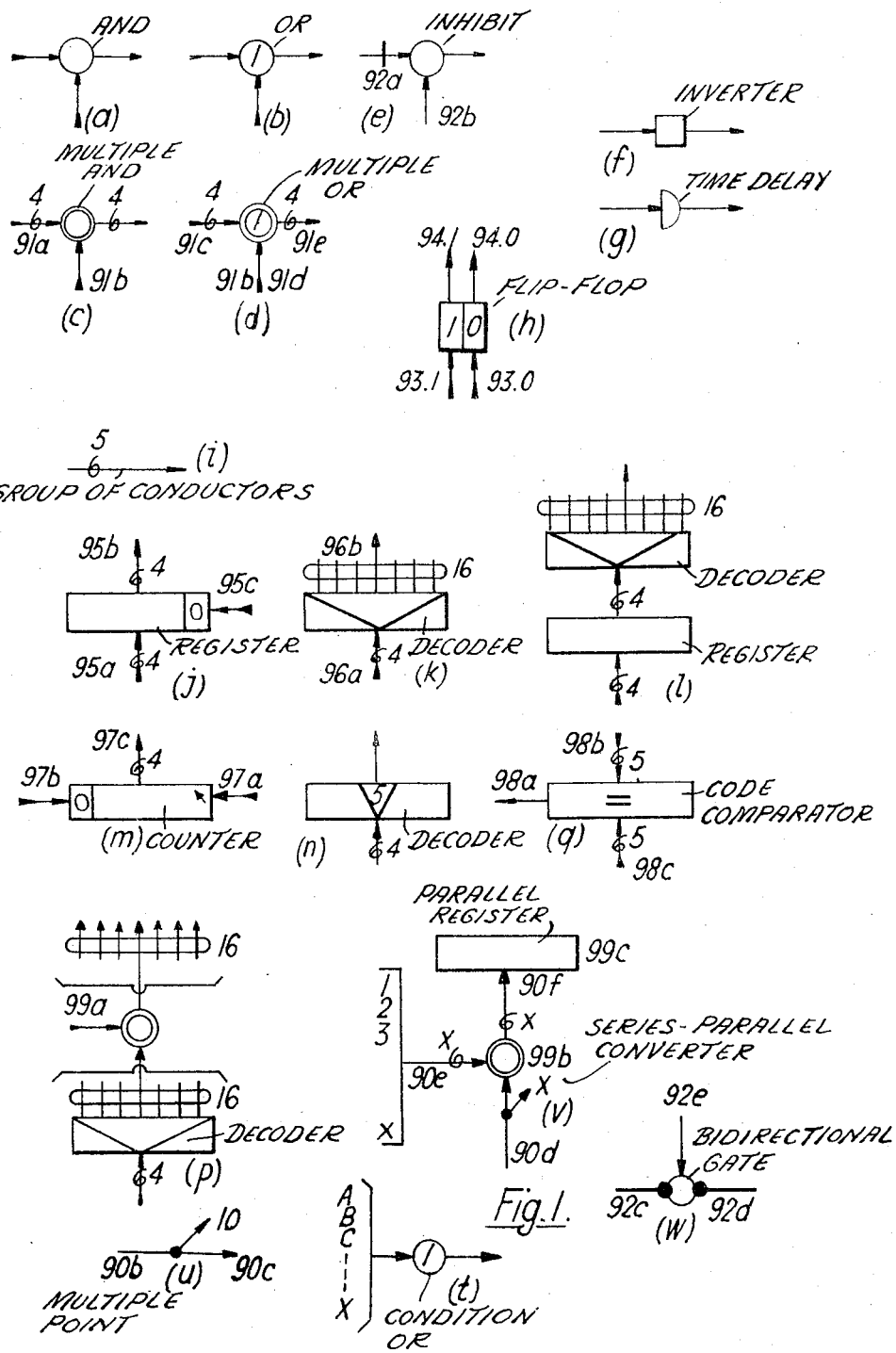
FIGURE 1 shows the different logic symbols used in the following figures.

The invention relates to a time division multiplex telephone system using pulse code modulation signals which are extended through a network of gates 100. These systems experience internal blocking when a call cannot be completed to an idle line because all immediately available paths are busy. If any idle channels are available when the blockage occurs, the existing connections are rearranged to remove the blockage. Then the new call may be established as if there had been no blocking.

The steps which are followed to complete the rearrangement of connections are:

(1) Search for a row trunk (designated $Rn$) which can be connected to a function or multiplex highway (designated $Co$) during a given time period (designated $tx$) and for a column trunk (designated $Cp$) which can be connected to the row trunk $Rn$ during a second time period (designated $ty$);

(2) Transfer the connection from the time period $tx$ to the other time period $ty$ and break the earlier connection $Rn-Cp$, (3) Reestablish the broken connection through a by-pass switch while a search is being made to find a new order in which all connections may be completed.

(4) A search is made and a new set of connections are discovered which enable all of the connections to be set up.

(5) Then, the new arrangement of connections which were discovered during the search are set up in the network, and the by-pass connection is released.

Before undertaking the description of the invention, the principle of notations in logical algebra will be reviewed briefly. This algebra is that used in some cases in order to simplify the writing when describing logical operations. The subject is comprehensively treated in several papers, and in particular in the book "Logical Design of Digital Computers" by M. Phister (J. Willey, editor).

Thus, if a condition characterized by the presence of a signal is written A, the condition characterized by the absence of the said signal will be written $\overline{A}$. These two conditions are connected by the well known logical relation $A \times \overline{A} = 0$ in which the sign "$x$" is the symbol of the coincidence logical function or AND function.

If a condition C appears only if conditions A and B are present simultaneously, one writes $A \times B = C$ and this function is achieved through a coincidence gate or AND circuit.

If a condition C appears when at least one of the two conditions E and F is present, one writes $E + F = C$ and this function is achieved through a mixing gate or OR circuit.

Since these logical functions AND and OR are commutative, associative and distributive, one may write $A + B = B + A$; $A \times (B+C) = A \times B + A \times C$; $(A + B)(C+D) = A \times C + A \times D + B \times C + B \times D$; etc.

Last a function of two variables A and B may present four possible combinations, and if one writes $A \times B$, the whole of the three others is represented by the expression $\overline{A \times B}$.

The meaning of the symbols used in the drawings of the present description will also be defined.

FIGURE 1 shows the different logic symbols used:

FIGURE 1($a$) shows a single AND circuit;

FIGURE 1($b$) shows a single OR circuit;

FIGURE 1($c$) shows a multiple AND circuit, i.e. comprising, in the case of the example, four AND circuits one of the inputs of which is connected to each one of the conductors 91$a$ and the second input of which is connected to a common conductor 91$b$;

FIGURE 1($d$) shows a multiple OR circuit which comprises, in the case of the example, four two-input OR circuits (91$c$ and 91$d$) and which enables to obtain on the four output conductors 91$e$ the same signals as those applied to either one or the other inputs;

FIGURE 1($e$) shows an inhibit gate or an AND circuit having two inputs 92$a$ and 92$b$ and which is blocked when a signal is applied on the input 92$a$;

An input of an AND circuit is energized when a signal is applied on said input, and the AND circuit is activated if all its inputs are simultaneously energized.

FIGURE 1($f$) represents an inverter circuit;

FIGURE 1($g$) represents a time delay circuit;

FIGURE 1($h$) represents a bistable circuit or flip-flop to which a control signal is applied on one of its input 93–1 or 93–0 in order to set it respectively to the 1 state or to the 0 state. A voltage of same polarity as the control signal is set up on the output 94–1 when the flip-flop is in the 1 state and on the output 94–2 when it is in the 0 state. The logical condition characterizing the fact that the flip-flop is in the 1 state will be written B1 whereas the logical condition characterizing the fact that it is in the 0 state will be written $\overline{B1}$;

FIGURE 1(i) shows a group of several conductors, five in the example considered;

FIGURE 1(j) shows a register with flip-flops. In the case of the figure it comprises four flip-flops the inputs 1 of which are connected to the conductors of the group 95a and the outputs 1 of which are connected to the group of conductors 95b. The digit 0, placed at one end of the register means that this latter is reset to zero when a signal is applied on the conductor 95c;

FIGURE 1(k) shows a decoder, which, in the case of the example, transforms a four digit binary code applied by the group of conductors 96a into a code 1 out of 16, i.e. that a signal appears on only one out of the 16 conductors 96b for each one of the numbers applied to the input;

FIGURE 1(l) shows the combination of a register and a decoder;

FIGURE 1(m) shows a counter with flip-flops which counts the pulses applied on its input 97a and which is reset to zero by the application of a signal on its input 97b. The outputs 1 of the flip-flops are connected to the output conductors $\overline{97c}$;

FIGURE 1(n) shows a decoder which is conditioned in such a way as it delivers an output signal only when the binary number, the decimal equivalent of which is 5, is applied to it;

FIGURE 1(p) shows a decoder with 16 outputs with insertion of a group of 16 AND circuits which are activated when a signal is applied on their input 99a;

FIGURE 1(q) shows a code comparator which delivers a signal on its output 98a when the five digit codes applied on its inputs 98b and 98c are identical;

FIGURE 1(t) shows a single OR circuit comprising a certain number of inputs on which one of the conditions A, B, C . . . X may appear;

FIGURE 1(u) shows a multipling of conductors, i.e. that ten conductors identical to conductor 90c are connected in parallel;

FIGURE 1(v) represents a series-parallel conversion circuit. The $x$ digit code group arriving in time succession on the conductor 90d is multiplexed into $x$ conductors and each of said conductors is connected to the first input of a different AND circuit of the multiple AND circuit 99b. The second input of each these single AND circuits is connected to one of the $x$ conductors 90e which receive respectively, in time succession, the "advance signals" 1, 2, 3 . . . $x$. Consequently the $x$ single AND circuits are successively activated and the output signals appear separately over the $x$ conductors 90f and are stored in the parallel register 99C. A similar circuit allows for the parallel-series conversion;

FIGURE 1(w) represents a bidirectional electronic gate which, when activated by a signal applied to its input 92e, allows for the transfer of signals between the conductors 92c and 92d and conversely.

In the course of the description, the expression "group of conductors" will be often used. This expression characterizes:

Either a certain number of conductors each one assigned to the transmission of a particular signal, the different signals presenting a certain common characteristic;

Or a certain number of conductors assigned to the transmission of a binary code.

Thus a group of conductors assigned to the transmission of channel codes or of channel time slot codes will comprise $v$ conductors.

Figure 2:
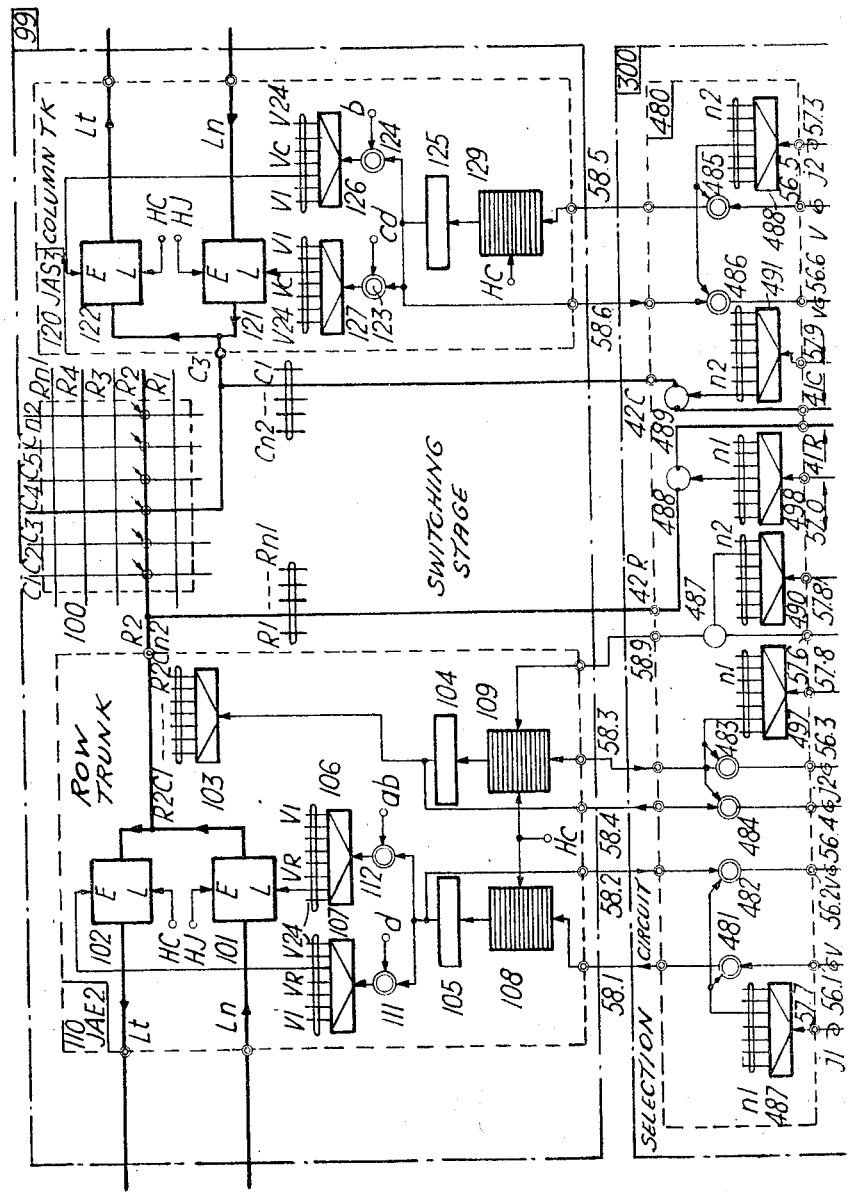
FIGURE 2 shows, at its upper part, the switching stage 99 and, at its lower part, the selection circuit.

The operations of setting up and cut-off of connections in a switching stage are controlled by a marker circuit receiving orders and initial data from a common control circuit. The basic principles of setting up a correction is the switching stage between the channel Ve of a row trunk JAE2 and the channel Vs of a column trunk JAS3 is shown by FIGURE 2, the upper part of which represents the circuits of the switching stage 99 involved during a given connection.

A buffer store or "incoming line data store" is connected to each incoming trunk, as shown at 101 in JAE2 and 121 in JAS3. This data store enables the system to convert the times of the communication channels.

On the other hand, one is led, for similar reasons, to place a second data store on the outgoing line in order to make the order of the channels independent from the time position of the connection setting up. These stores are respectively referenced 102 in JAE2 and 122 in JAS3.

Since the switch 100 comprises the rows R1 to Rn1 and the columns C1 to Cn2, the cross point R2C3 which enables the connection of the trunks R2 and C3 is selected, in the switch 100, by the interpretation of the trunk code JAS3 in the decoder 103 placed in the trunk circuit JAE2. If $tZ$ designates the channel time slot of setting up of the connection, this code has been extracted from the line Z selected, at the time slot $tz$, in the space path store 109 and written in the register 104 associated with the decoder 103.

When this operation is performed, the flowing away of a communication consists in carrying out the bidirectional transfer of data between the incoming line data stores and the outgoing line data stores. First data is transferred between the stores 101 and 122. Then it is transferred between the stores 121 and 102. This data transfer is obtained by selecting, in the data stores, the locations in which are written, first the data related to the channel Ve of the trunk JAE2, and second, the data related to the channel Vs in the trunk JAS3, in order to enable the reading in the stores 101 and 121 and the writing into the stores 101 and 122.

In the trunk JAE2, for instance, the selection of the locations is obtained by the interpretation, in the decoders 106 and 107 associated respectively with the stores 101 and 102, of an instruction written in an instruction register 105 and which has been extracted at the beginning of the time $tZ$ from the the "time path store" 108. The instruction is constituted by the code of the channel Ve.

The selection of the addresses in the trunk JAS3 is obtained in an absolutely identical way by means of the circuits 125 to 127 and of the store 129, the instruction being constituted by the code of the channel Vs.

In short, the connection taken by way of example is set up by utilizing the following informations: setting up time $tZ$, trunk codes JAE2 and JAS3, channel codes Ve and Vs. The three last informations are extracted from a path store at the time $tZ$ and the trunk code JAE2 is used indirectly by the fact that the decoder associated with the space path store is placed in this trunk circuit and that it can thus select in the switch only one of the cross points R2C1 to R2Cn2 placed on the row R2.

It is thus seen that, according to a characteristic of the invention, all the informations related to the connections are stored in stores placed in the trunk circuits and that said connections are set up in time succession without any external intervention.

Now, the organization of the path stores and of the data stores will be briefly described. The path stores have been shown on FIGURE 2 by square hatched horizontally. They comprise, on the one hand, $m-1$ or 24 rows assigned in order, to the channel time slots $t1$ to $t24$ at the exchange time, and on the other hand, the number of columns necessary for the inscription of trunk codes in the space path stores and of channel codes in the time path stores.

Assuming that the instructions have been previously registered therein the read-out operation is carried out in parallel form and a cyclic way, at the exchange time. The row addresses are selected in the order $t1$ to $t24$. Thus, the exchange clock plays the role of an address counter. This mode of reading has been shown symbolically in FIGURE 2, by an inscription "HC" placed on the side of each one of the stores.

Consider a given trunk connected to one row, the trunk JAE2 for instance. At each channel time slot, the circuit reads the trunk code stored in the space path store 109 associated with the trunk. Through the decoder 103, this reading enables the selection of one of the cross points R2C1 to R2CCn2. In the same way, for each one of these channel time slots, the channel codes registered on the corresponding rows of the time path stores associated with the connected trunks by the selection of the cross point enable the bidirectional transfer of data related to the connection set up.

The detail of the path stores comprise also $m-1$ or 24 rows, which are assigned, in order, to the inscription of the messages transmitted on the channels 1 to 24 of the trunk.

The mode of cyclic inscription at the trunk time V1 to V24 of the messages coming from outside, in the incoming line data store, has been shown symbolically in FIGURE 2, by an arrow referenced HJ placed on one of the sides of the stores 101 and 121. The letter "E" placed inside of the square representing the store means that these trunk time signals are used for the writing.

The messages are transmitted outwardly in a fixed order whatever be the channel time slot of the connection. The reading of the outgoing line data stores 102 and 122 is carried out also in a cyclic way, at the exchange time $t1$ to $t24$. This is shown symbolically, in the FIGURE 2 by an arrow referenced "HC" in front of which is written the letter "L" for "read-out."

It has been seen, during the description of the example of connection, that the outputs of the incoming line and outgoing line data stores were mixed together and that the selection of the addresses was obtained by the interpretation, at each channel time slot, of an instruction extracted from the time path store, the reading of an incoming line data store and the writing in an outgoing line data store, are thus carried out at the exchange time in a cyclic way, i.e. in an order different from that determined by the address counter (signals $t1$ to $t25$).

As it has been indicated previously, each direction of transmission occupies, in the switch 100, a fraction of a digit time slot. For instance, the transmission from JAE2 towards JAS3, may be carried out at the basic time slots $a$ and $b$ of each digit time slot, and the transmission from JAS3 towards JAE2 at the basic time slots $c$ and $d$. These times are delimited by the multiple AND circuits 112 and 123 which controls the operation of the decoders 106 and 127 associated with the incoming data stores. Due to the type of store used, the multiple AND circuits 111 and 124, which control the operation of decoders 107 and 126 associated with the outgoing data stores, are activated only during the basic time slots $d$ and $b$, respectively.

It will be noted, that in the above description, the selection of a cross point is carried out from a space path store, which has been located, by way of a non limitative example, in the trunk circuit JAE2. The trunks connected to the rows or "row trunks" are thus particularized with respect to the trunks connected to the columns or "column trunks."

In all the cases, the bidirectional tranfer of data relative to a connection is carried out, as it has been seen previoulsy, by the interpretation of an instruction stored on the line Z of the path stores of the two conisdered trunks.

If JR and JC designate the codes of the column and of the row trunks to be connected, and VR and VC the codes of the channels in these trunks which will be occupied by this connection, it is thus necessary, in order to set it up, to register the codes JC, VR, VC on the lines Z of the path stores of the trunks JC and JR. Similarly, in order to break-off this connection, these codes will have to be cancelled on the lines Z of the path stores of the trunks JC and JR, this being obtained, by way of example, by writing therein the code zero.

When such a switching stage is used in a telephone or telegraph switching system, the setting up of the connection between the two trunks is carried out by means of a "traffic connection" between the channel to which is connected the calling subscriber and the channel to which is connected the called subscriber. The setting up of such a traffic connection requires, first, the setting up and the cutting off of a certain number of "service connections," and second, the performance of a certain numbe of rearrangement operations if there are no free channel time slots $tC$ common to both trunks. The cutting off of a traffic connection may also require the setting up and the cutting off of service connections.

The service connections enable a centralized control device or "common control circuit" to receive informations concerning the traffic connection. One may thus realize that the gathering of the informations coming from outside the exchange, necessary for the setting up of a traffic connection between a channel on the trunk connected to the calling subscriber and a channel on the trunk giving access to the called subscriber, requires the following operations:

Detection of the call (by a call detector);

Setting up of a service connection between the calling subscriber and a device for exchange of information connected to the switch in the same manner as a trunk (this device may be, for instance, a call register);

Setting up of a service connection between a device for exchange of information connected to the switch and the called subscriber (this device may be for instance a "sender-receiver");

After transmission to the common control circuit of the information received by the auxiliary circuits, cutting off of the service connections and setting up of the traffic connection.

For each one of these seting up and cutting off operations, whether it concerns a traffic connection or a service connection, the common control circuit receives from its associated elements (call detectors, registers, sender-receivers, etc.), either the totality of the information required, or only part of this information.

In the first case, the common control circuit transmits the information as "initial data" to a marker circuit whereas at the same time it orders the performance of a "code modification" operation in the path stores of the trunks of which it has just given the codes. This operation takes place under the control of a programme placed in the marker circuit.

In the second case, one or several informations are missing and the common control circuit transmits the initial data it has in its possession whereas at the same time it commands the performance of a "data search" operation in certain path stores. This operation also takes place under the control of a programme located in the marker circuit. When the initial data is complete, it may be returned to the common control circuit which initiates then a code modification operation.

In the case of the setting up of a connection, one of the operations of data search consists in searching for a channel time slot $tC$. The search is for a free channel time slot $tx$ on the row trunk and a free channel time slot $ty$ on the column trunk. If such free channels are not found, there is an internal blocking and the flow channel time slot of certain communications previously established must be modified until the blocking is suppressed and the connection may be established at the channel time slot $tx$.

Each one of the rearrangement operations which are carried out for that purpose requires the performance, not only of a certain number of code modifications and of data search operations, but also of "code transfer" and "connection by-pass" operations. These operations are also controlled by a programme located in the marker circuit.

The orders, sent from the common control circuit to the marker circuit, which initiate the programmes located in the marker circuit are referenced A, B, C, D and E.

The order B is a code modification order and controls the performance of a connection cut off.

The orders C, D and E are data search orders and which command, respectively: a free channel search in a given trunk, a path identification and a channel time slot search $tC$ or, when it does not exist, of the channel time slots $tx$ and $ty$. If a trunk code and a channel code in this trunk is known, the path identification consists of the channel time slot during which this channel is conducting and the identity of the trunk and of the channel with which it is then connected.

The order A enables the marker circuit, to make a series of rearrangement operations until the configuration of the connections established during the channel time slot $tx$ is such that the blocked connections may be established without disturbance. The programme initiated by this order comprises a certain number of "phases" and "times" during which are carried out code modification operations, data search operations, code transfer and connection by-pass operations, the principle and performance of which will be detailed further on.

By way of example, in the continuation of the description, certain cases which may happen in the application of such a switching stage to a telephone system will be studied, i.e. those cases in which the information received is such that the marker circuit must carry out a certain number of successive operations. This corresponds for instance to the successive sending, through the common control circuit of the orders C, E and A (for the setting up of a connection), or of an order D followed by an order B (for the cutting off of a connection).

Figure 3:
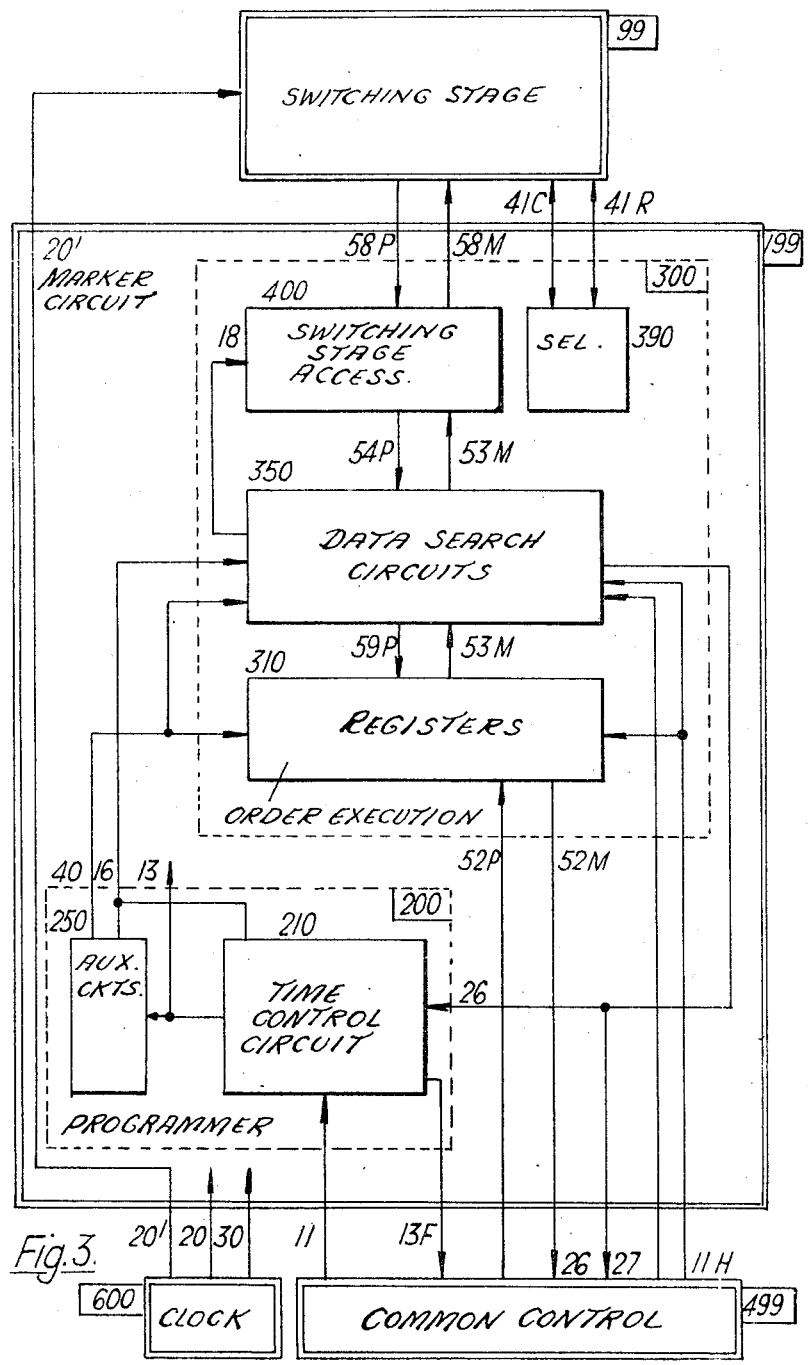
FIGURE 3 shows the block diagram of the marking circuit.

FIGURE 3 represents a block diagram of the circuits associated with the switching stage referenced 99, and wherein the common control circuit is referenced 499 and the marker circuit 199.

The marker circuit comprises, first a programming block 200 which elaborates or operates in particular the phase signals and the time signals of the programmes related to the different orders received from the common control circuit, and second, an order execution block 300 in which the operations controlled by said signals are carried out.

The block 200 comprises the time control circuit 210 in which the phase signals are elaborated and the group of ancillary circuits 250 in which are elaborated in particular, the time signals which control the performance of the rearrangement operations.

The initial data and the corresponding orders are transmitted from the common control circuit to the marker circuit, this being performed respectively on the groups of conductors 52P connected to the group of registers 310 and 11 connected to the programming block 200. The elaboration of the phase signals in the circuit 210 and of the time signals in the circuit 250 is carried out, according to the received order in accordance with, first, time signals delivered by the exchange clock 600 on the group of conductors 20, and second, informations received from the other circuits of the marker circuit on the conductors 11 and 26. These phase and time signals are divided into "operation signals" and "execution signals." The operation signals are distributed to the order execution block 300 on the group of conductors 13 and the execution signals are transmitted to the common control circuit on the conductor 13F.

Most of the operation signals control simultaneously, in the marker circuit, the execution of two types of different operations:

The first type of operation consists in the selection of one or several circuits placed in the switching stage by the interpretation of the initial data (trunk codes) stored in the registers provided therefore. This type of initial data is supplied under the form of a $j1$ digit number for a row trunk code, and under the form of a $j2$ digit number for a column trunk code. The selected circuits are either time path stores or space path stores or inputs to the switch 100 (FIGURE 2).

The second type of operation comprises one of the following elementary operations:

(a) A data search by the consultation of the codes stored on the rows of certain path stores of one or of several selected trunks and which are read in a cyclic way at the exchange time. The data obtained, or "results," are either a marked channel time slot ($tC$, $tD$) or one or several channel or trunk codes or a particular signal.

A signal having a duration of channel time slot and which reappears at each frame period, by occupying the same position is called "marked channel time slot signal."

(b) A code modification in one or several path stores of one or several selected trunks. The codes written either the zero code or the codes extracted from the group of registers 310.

(c) The by-passing through a circuit external to the switch, of a connection which is broken during a re-arrangement elementary operation.

Besides, one of the operation signals controls the performance of operations for which it is not necessary to carry out the selection of a circuit in the switching stage, i.e. code transfers and detection of an end rearrangement.

An execution signal, elaborated in the circuit 210 when all the performance phases of a given elementary order are completed, is transmitted by the marker circuit to the common control circuit on the conductor 13F for indicating that the results of the operation which has just ended are available. The common control circuit may control then, by sending a signal on the conductor 11H, either the transfer, over the groups of conductors 52M and 26, of these results in its registers and the resetting to zero of the marker circuit, or control directly a new operation by utilizing the results of the preceding operation.

Before undertaking the detailed description of the block diagram of FIGURE 3, one will describe the execution of code modification operations in the path stores.

Figure 4:
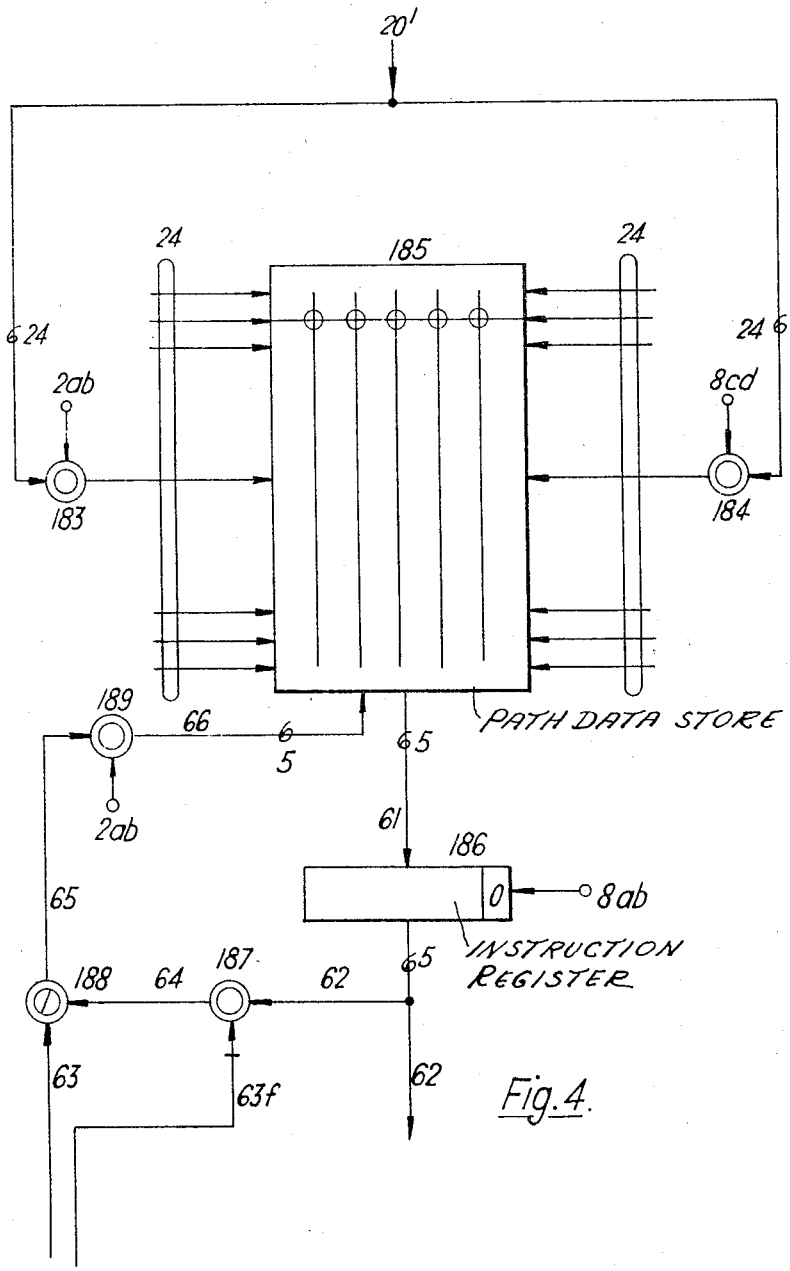
FIGURE 4 shows the diagram of the access devices to a path store.

FIGURE 4 represents, by way of example, a diagram of the access circuits to a path store.

As it has been seen previously, the matrix 185 comprises $m-1$ lines, or 24 in the case of the example, and as many columns as it is necessary to store either channel codes (for $m=25$, this code comprises $v=5$ digits in a non-redundant binary code) or row trunk codes. In the course of the description such codes will be designated under the general term of "number codes" as opposed to "zero codes."

The codes extracted from this matrix 185 are transmitted on the group of conductors 61 and are stored in the instruction register 186. This instruction, which is available on the group of conductors 62, is used to select, during the channel time slot of the connection set up, either an address in a data store or a cross point in the switch. If one considers, for instance, the instruction stored on the line 13 of the store, this code must be available in the register 186 during the times $t13.1$ to $t13.7$ reserved to the bi-directional transfer of the seven digits of a message between the incoming line and outgoing line data stores.

In order to fulfill this condition, the cyclic selection of the lines of the path stores is carried out by means of the shifted channel time slot signals $t'1$ to $t'24$. These signals are received over the group of 24 conductors 20' and are transmitted, in the case of a time path store, to the selection circuit of the matrix 185 by the activation, in $8cd$, of the multiple AND circuit 184. As it has been seen previously, one has, (if considering the line 13), $$t'13.8cd = t12.8cd$$

so that the transfer of the code in the register 186 is performed before the time where the transfer of data begins in the switching stage.

The register 186 has been previously reset to zero at the time 8ab.

By way of a non-limitative example it is assumed that the storage matrix used is of the type wherein a number code is destroyed when read and replaced by a "zero code."

It is thus necessary to provide for a re-writing device of the codes read in matrix 185 before resetting the instruction register 186 to zero.

In order to carry out this operation, the group of output conductors 62 is connected to the group of conductors 65 assigned to the inscription of the codes in the matrix through the AND circuit 187 and the OR circuit 188.

When the code stored in the register 186, coming for instance from the line 13, must be re-written in the matrix without modifications, the AND circuit 187 is activated. The line 13 being selected in 2ab by the activation of the AND circuit 183, the code is transmitted in parallel form to the columns of the matrix over the groups of conductors 62, 64, 65 and 66 by the activation in 2b, of the multiple AND circuit 189.

A code read in the line 13 at the time $t'13.8cd = t12.8cd$ is thus rewritten on the same line at the time $$t'13.2b = t13.2b$$

The modifications brought to the contents of a line may be the replacement:
 Of a code number by the zero code;
 Of a code number by another code number;
 Of a zero code by a code number.

The AND circuit 187 controls this code modification operations. A "code modification" signal appearing on the inhibit input 63f of this AND circuit during the considered channel time slot (in the case of the example, this channel time slot is t13) characterizes this operation, and the code which is present on the group of conductors 62 cannot be re-written. If, during this time slot, no signal appears on the inputs 63 of the multiple OR circuit 188, no code number is stored in the corresponding line of the matrix which thus contains the zero code.

If a number code is applied during this time to the group of conductors 63, it passes through the OR circuit 188 and is stored in the matrix 185.

The conductor 63f on which the code modification signal is transmitted is an additional conductor associated with the group of conductors 63 on which the new code to be registered is transmitted. The codes are always transmitted to the path stores through a multiple AND circuit placed in the order execution block 300 which is activated at the considered channel time slot and the signal which activates this AND circuit is used for the elaboration of the signal 63f.

The order execution block 300 which performs the operations controlled by the phase signals comprises the following elements:
 The group of instruction registers 310;
 The group of data search circuits 350;
 The group of switching stage access circuits 400.

The initial data are transmitted from the common control circuit 499 to the group of instruction registers 310 on the group of conductors 52P.

Since the switching stage comprises n1 row trunks connected to the n1 rows of the switch and n2 column trunks connected to the n2 columns of the switch, the block 400 allows for the selective access to the path stores of the different trunks, the choice being determined by the signals delivered by a certain number of decoders. The signals are obtained by the interpretation, in said decoders, of row and of column trunk codes received from the block 310. The selection of a row trunk may also be obtained by the interpretation of a code supplied, on the group of conductors 40, by the group of ancillary circuits 250, the advancing of said code being cyclic.

The data search, code modification and code transfer operations entail exchange of codes between the circuits 99, 400, 350 and 310. These are carried out on the groups of conductors 58P, 54P and 59P from the switching stage towards the block 310 and on the groups of conductors 53M and 58M in the opposite direction.

All the operations concerning a data search are performed in the block 350. The codes transmitted cyclically from the switching stage are either selected therein at a marked channel time slot, or compared to some of the codes stored in the block 310, or to channel time slot codes which are used in this case as channel codes.

The results obtained are, as it has been seen during the discussion of the second type operations, either one or several channel and/or trunk codes which are stored in registers placed in the blocks 400 or 310, or a code modification channel time slot tx, ty or tD which is marked, or at last, some particular signals which are stored special unit storage elements.

An execution signal 13F characterizing the execution of a data search order is sent to the common control circuit 499 which is thus informed that the results of the operation are available. The common control circuit may control afterwards, by means of an order transmitted on the conductor 11H, the transfer of the results in its own registers. This transfer concerns the codes stored in the registers of the block 310 (on the group of conductors 52M) and the marked channel time slot codes tD, tx, ty (on the group of conductors 26).

The circuits controlling the performance of the code modification operations in the path stores are placed in the block of access circuits 400. For these operations, one uses the trunk and channel codes related to the considered connection which are received from the circuit 499 and the marked channel time slot signals tx, ty or tD which are obtained, in the block 350, from their codes received on the group of conductors 27. These codes and these signals can also be available in the blocks 310 and 350 at the end of data search operation. They can then be used directly for a data modification operation following immediately said search operation in which case the execution signal 13F relative to the search operation is not followed by a transfer signal 11H.

The by-passing of a connection previously established by the selection of a cross point in the switch 100 (FIGURE 2) connecting a row and a column of said switch is made, after the selection of the considered inputs, in the block 390. This circuit is connected to the switching stage by the conductors 41R and 41C upon which is effected the bi-directional transfer of data.

The signals 20 and 30 mentioned during the description of the FIGURE 3 are delivered by the exchange clock 600 which comprises a high stability generator controlling the advancing of three counters. These counters show out respectively the codes of the basic time slots a, b, c and d, of the digit time slots 1 to 8 and of the channel time slots t1 to t25. These codes are interpreted by means of decoders associated to the counters and four signals a, b, c, d, are available on four conductors, eight digit time slot signals are available on eight conductors, and 25 channel time slot signals are available on 25 conductors. All these conductors carry the common reference 20.

The exchange clock supplies also, on the group of conductors 20', the shifted channel time slot signals t'1 to t'25. These signals are applied to the switching stage 99. On the other hand, the channel time slot codes t1 to t25 are transmitted on the group of conductors 30.

The functions carried out in the marker circuit in response to the operation signals delivered by the programming block 200 will now be described.

As it has been seen previously, each one of these signals initiates simultaneously an operation of the first type (selection) and an operation of the second type with the exception of certain signals of the phases A and E.

The order B, which controls the breaking of a connection when the two trunk codes as well as the marked channel time slot $tD$ are known, comprises two phases BI and BII. The phase BI comprises a selection of path stores and the inscription of the zero code in the lines D of said path stores. The phase BII is the phase of the elaboration of the execution signal F.

The order C which controls the free channel search operation in a given trunk comprises two phases CI and CII. The phase CI comprises a selection of path stores and a data search in the time path store of the considered trunk. The result is either the code of a free channel and a "free channel" information referenced VL, or a "busy" information referenced OCI if no channel at all is free. Two independent storage elements are provided to store that information. The phase CII is the phase of elaboration of the execution signal F.

The order D controls a path identification operation and comprises four phases. This operation consists in finding, when knowing a trunk code and a channel code in this trunk, the trunk and the channel with which it is connected as well as the channel time slot $tD$ of the connection. The performance of the operation is different according to whether row codes or column codes are searched for. The circuit 210 elaborates in the first case an order DR and in the second case an order DC.

The phase DCI and the phase DRI comprise a selection of the time path store of the trunk the code of which is known and a search of data in this store in order to mark the channel time slot $tD$ of the connection. This channel time slot is shown up under the form of a time signal.

The phase DCII comprises a selection of the space path store of the trunk, the code of which is known (the code JR of a row trunk) and a data search in said store which consists in the selection of the trunk code received at the marked channel time slot $tD$. This code is the result of the operation, i.e. the code JC of the column trunk connected with JR and it is stored in the block 310.

The phase DRII compirses a successive selection of the path stores of the row trunks associated with the exchange which enables a succession of data search operations in the space path stores. This cyclic operation proceeds up to the time when a column trunk code read at time $tD$ in one of these stores is identical to the known code JC. The result is then the code JR of the row trunk whose space store was selected at this time. This code is stored in the block 310. This operation consists thus in the selection of a trunk code at the marked channel time slot $tD$.

The phases DCIII and DRIII comprise a selection of the time path store of the trunk the code of which has been found during the phase II. This selection is used for a data search which consists in the selection of a channel code at the marked channel time slot $tD$. The result is a channel code which is stored in the block 310.

The phases DCIV and DRIV are used for the elaboration of the execution signal F.

The order E which controls the search either of a free channel time slot $tC$ common to the two trunks to be connected, or of channel time slots $tx$ and $ty$ which have been previously defined comprises three phases.

The phase EI is a waiting phase and it does not comprise the performance of any operation of the first or of the second type.

The phase EII comprises a selection of the time path stores of the considered trunks and the performance of a data search. This latter consists in searching and marking, either a common free channel time slot $tC$, or a free channel time slot $tx$ on the row trunk and a free channel time slot $ty$ on the trunk.

The phase EIII is the phase of elaboration of the signal F.

The principles of the rearrangement will now be outlined.

In this description, a connection between, for instance, the row trunk $Rx$ and the column trunk $Cv$, will be referenced ($Rx$-$Cv$). If the communication must flow at the channel time slot $tZ$, it may be set up if the code $Cv$ of the column trunk is stored on the line Z of the space path store associated to this trunk $Rx$ and this store will be referenced MCS-$Rx$. The channel code related to this connection ($Rx$-$Cv$) stored on the line Z of the time path store of $Rx$ (or: MCT-$Rx$) will be referenced ($\underline{Rx}$-$Cv$) and the one stored on the line Z of the time path store of $Cv$ (or: MCT-$Cv$) will be referenced ($Rx$-$\underline{Cv}$).

As it has been seen previously, if one associates $n1$ row trunks and $n2$ column trunks with the switch and if $n$ designates the smaller one of these numbers, $n$ connections at most may be set up per channel time slot and $m \times n$ different connections during a frame period. If the total number of connections is substantially lower than $m \times n$, there is generally no difficulty in finding a common channel time slot $tC$. Nevertheless, when the total number of connections is close to the maximum number $m \times n$, there is an increasing probability of not finding a channel time slot $tC$ and thus the communication may not be set up owing to the internal blocking.

In the device according to the invention, a new connection may always be set up if a free channel is available on the called trunk.

It has been seen, before the beginning of the description of the FIGURE 3, that in the examples studied in the description of the system, the setting up of a connection was carried out by the successive performance of the orders C, E and A.

The order C for a free channel search ends by the elaboration either of a signal OC meaning that none of the channels on the called trunk is free, or of a signal VL meaning that a free channel has been found. In the first case, the occupation signal OC controls the stopping of the setting up of the connection, and in the second case, the signal VL enables the initiation of the operation E of free channel time slot search.

Since the calling subscriber has a channel available and since a channel is free on the called trunk, this means that at most $mm-1$ connections flow during a frame period and thus that the new connection may be set up, as the case may be after a rearrangement of the existing connections this having the effect of changing the flow channel time slots of certain of these connections. The operation E will thus always enable to show up, either a common free time position $tC$ or channel time slots $tx$ and $ty$.

One shall suppose that a connection has to be set up between a given channel of a row trunk $Ro$ and a given channel of a column trunk $Co$, this connection being referenced ($Ro$–$Co$). First, one begins by searching during the phase EII to determine whether a common channel time slot $tC$ exists. If one is found the setting up of the connection may be carried out. If no one is found, one searches during this same phase EII:

A channel time slot $tx$ for which the trunk $Ro$ is not connected to any column trunk. This means that the lines number $x$ of the space an time path stores of the trunk $Ro$ contain the zero code;

A channel time slot $ty$ for which the trunk $Co$ is not connected to any row trunk. This means that this code is not stored in any of the lines number $y$ of the space path stores and that the line $y$ of the time path store of the trunk $Co$ contains the code zero.

A certain number of connections is already set up through the switching stage during these channel time slots $tx$ and $ty$. In particular:

At the time position $ty$, the trunk $Ro$ may be connected with a trunk $Cq$;

At the channel time slot $tx$, the trunk $Co$ may be connected to a trunk $Rn$;

At the channel time slot $ty$, the trunk $Rn$ may be connected with a trunk $Cp$.

The order A, which is the order of setting up of connection, comprises the phases AI, AII and AIII, this last one being the phase of elaboration of the signal F.

The phase signal AI controls the writing operation, in the considered path stores, of the codes of a new connection and the phase signal AII controls the performance of a rearrangement elementary operation. It will be noted that, if a channel time slot $tC$ has been found, the programme of the order A carries out nevertheless a single elementary rearrangement operation.

Figure 5:
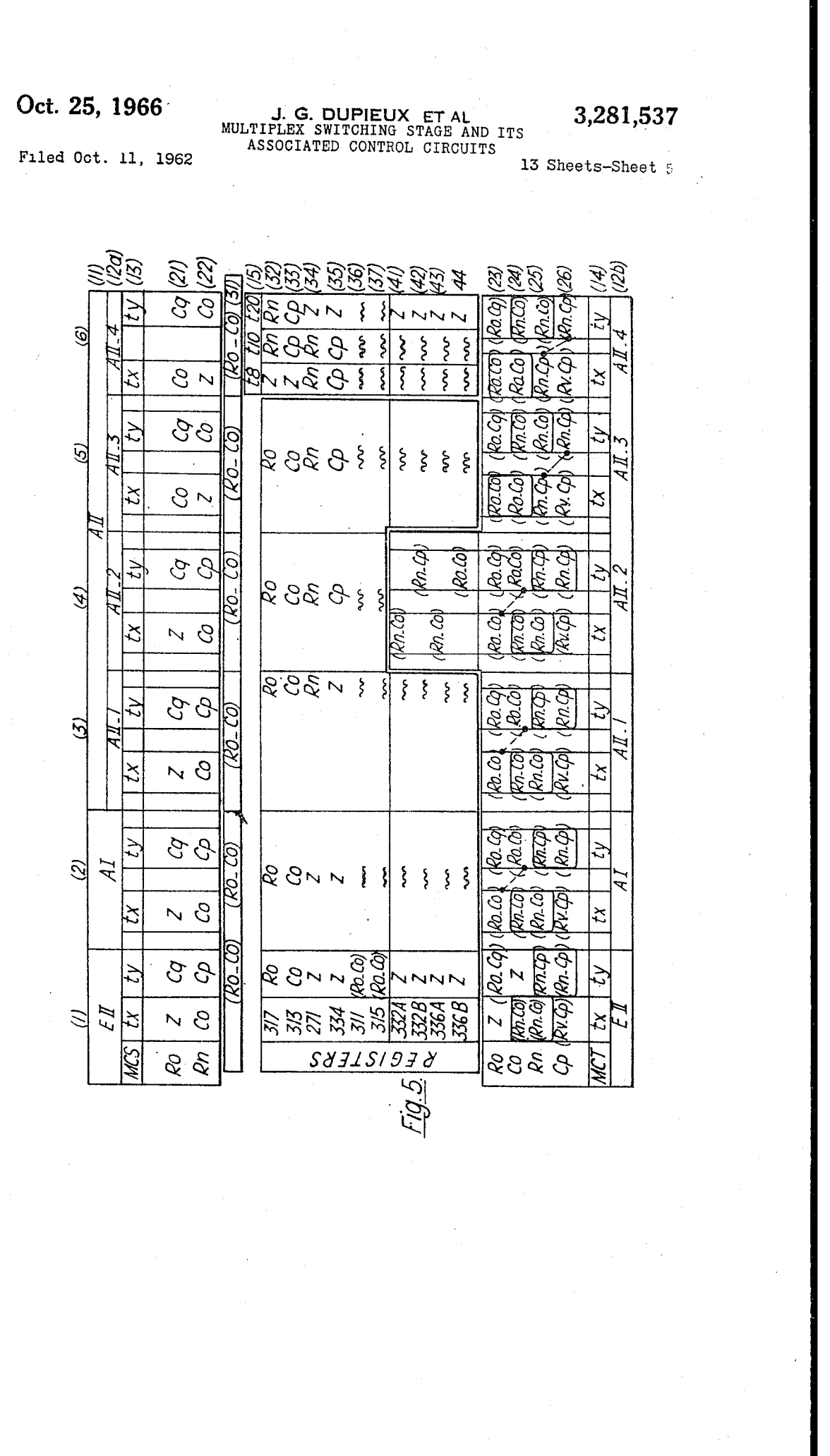

FIGURE 5 is a table giving the detail of the codes written in a certain number of registers and of path stores during the phases EII, AI and AII, this last phase signal being subdivided into four time signals AII-1, AII-2, AI-3 and AI-4.

The indications which are given in this table are the following:

Columns (1) to (6): assigned to the six signals enumerated hereabove (it will be noted, that for reasons of simplification, the time separating the phase EII from the phase AI has not been taken into account);

Lines (11), (12a), (12b): references of these signals;

Lines (13), (14), (15): time references of certain parts of columns reserved to trunk or channel codes located, either on the lines corresponding to these times in the space path stores—line (11)—or in the time path stores or in certain registers—line (15).

The table is divided into five parts:

(a) Codes stored in the space path stores MCS–R$o$ to which is reserved the line (21) and MCS–R$n$ to which is reserved the line (22);

(b) Codes stored in the following time path stores:
MCT–R$o$ to which is reserved the line (23);
MCT–C$o$ to which is reserved the line (24);
MCT–R$n$ to which is reserved the line (25);
MCT–C$p$ to which is reserved the line (26);

(c) Code of the connection to be set up to which is assigned the line (31);

(d) Codes stored in several registers placed in the block 310 (FIGURES 10 and 13) of the marker circuit:

The row trunk code stored in a register 317 (FIGURE 13) is located on the line (32);

The column trunk code stored in a register 313 (FIGURE 13) is located on the line (33);

The channel code in the row trunk, stored in a register 311 (FIGURE 13) is located on the line (36);

The channel code in the column trunk, stored in a register 315 (FIGURE 13) is located on the line (37);

The row trunk code stored on the group of conductors 40 is located on the line (34);

The column trunk code extracted from a space path store is stored in a register 317 (FIGURE 10) shown on the line (35);

Channel codes extracted from certain time path stores are stored in the registers 332A, 336A (FIGURE 10), and 332B, 336B (FIGURE 13), to which are assigned the lines (41) to (44). It will be noted that these channel codes have been placed at the locations corresponding to their inscription channel time slot in the registers 332 and 336, this channel time slot being given on the line (14). The contents of the other registers are not shown at particular channel time slots, and the codes indicated are those stored therein at the end of the corresponding time or phase;

(e) Codes stored in the different registers enumerated hereabove at the end of the times $t8$, $t10$, $t20$ of the time AII-4.

Each one of these five parts of the table has been delimited by a frame drawn in thick line.

When the code placed in one of the registers is not modified from one phase or one time to the next one, this has been shown symbolically by a wavy line drawn at the corresponding location. Last, in the lines (23) to (26), the two channel codes related to a same connection have been, either framed by a thick line when they are stored on the same line as their time path stores, or put into brackets and connected together by an interrupted line ended by two points when they are stored on different lines.

The codes stored initially in the path stores and in the marker circuit registers have been shown in the column (1).

The four codes characterizing the new connection (R$o$–C$o$) are stored in the registers 317, 313, 311 and 315 of the block 310.

The marking of the time positions $tx$ and $ty$ in EII indicates that zero codes (represented on the FIGURE 4 by the letter "Z") are stored, first, on the line $x$ of MCS–R$o$, and second, on the line $y$ of MCT–C$o$.

The phase AI comprises the selection of MCT–R$o$ and of MCT–C$o$ and a modification of codes in these stores consisting in writing the channel codes (R$o$–C$o$) and (R$o$–C$o$) respectively on the lines $x$ and $y$ of these stores. These codes have been shown, on FIGURE 5 in the lines (23) and (24) of the column (2) reserved to the phase AI.

The first one of these codes is stored on the line $x$ and the second one on the line $y$ and the location of one of these codes will have to be changed in order to make possible the setting up of the connection Referring to the upper part of the table—line (21) of the column (2)—it is seen that the line $x$ of MCS–R$o$ contains the zero code and thus that the connection will have to be set up in $tx$ by storing the code C$o$ at this location and by bringing back the code (R$o$–C$o$) on the line $x$. But, by storing the code C$o$ in the store MCT–R$o$, it is seen that this code would be located, in the case of the example, on the line $x$ of two different space path stores, i.e. MCS–R$o$ and MCS–R$n$.

Since it is not possible to select, at the time $tx$, a same column trunk C$o$ from two space path stores, the channel time slots of setting up of the connections R$n$–C$o$ and (R$n$–C$p$) will be exchanged. In practice, the code C$o$ alone will be transferred from the line $x$ to the line $y$ and the code C$p$ will be stored so that at the end of the same rearrangement operation, one will be again in the same initial conditions, i.e. with a new connection (R$n$–C$p$) to be set up.

The channel codes stored in MCT–R$n$ and MCT–C$o$ will also be transferred from the line $x$ to the line $y$, and as it will be explained further on, one will also be again in the same initial conditions. The duration of the phase AI is one frame period.

In order to carry out the permutation between connections (R$n$–C$o$) and (R$n$–C$p$) the codes R$n$ and C$p$ must first be found.

The search for the code R$n$ is carried out during the time AII-1 which comprises a data search by the cyclic selection of the space path stores of the row trunks similar to that effected during the phase DRII. The codes extracted successively from the different stores are compared to the code C$o$ stored in the register 313—line (33) of the FIGURE 5. When the comparator 343 delivers a signal, which will be referenced G1, at the channel time slot $tx$, the selected trunk is the trunk R$n$, this meaning that the code C$o$ was stored on the line $x$ of MCS–R$n$. The advance of the selector stops and it stores permanently the code R$n$. This code is shown on the line (34) of the FIGURE 5.

Since this operation lasts from 1 to $n1$ frame periods, the duration of the time AII-1 is variable and one shifts to the time AII-2 as soon as the code R$n$ is found.

The time AII-2 comprises two distinct data search operations performed simultaneously and lasts one frame period.

The first operation concerns a search for the code C$p$. It comprises the selection of MCS–R$n$ and a data search by selection of the code extracted from this store at the channel time slot $ty$, which is, as it may be seen from FIGURE 5, line (22), column (2), the code C$p$. This code is stored in the register 334, line (35).

The second operation concerns a first phase of the permutation of the channel codes located in MCT–R$n$ and MCT–C$o$. These two stores are selected and the data search (search for channel codes) is carried out by selection of the codes at the suitable channel time slots and these codes are stored afterwards in the registers 332A, 332B, 336A, and 336B. These codes have been located on the lines (41) to (44) of the column (4) at their selection channel time slot.

The time AII–3 comprises three distinct code modification operations performed simultaneously and lasts one frame period.

The first operation concerns the second phase of the permutation of the channel codes extracted from MCT–R$n$ and MCT–C$o$ and which have just been stored in the registers 332A, 332B, 336A and 336B. It comprises the selection of these time path stores for the writing of the codes in the same store as that from which they have been extracted, this writing being carried out on the line $x$ for the code extracted from the line $y$, and on the line $y$ for that extracted from the line $x$. This new distribution of the channel codes in the time path stores is represented on column (5), lines (23) to (26). By examining the table, it is seen that:

The channel codes concerning the new connection are now both stored on the line $x$ in MCT–R$o$ and MCT–C$o$. These codes are located, in FIGURE 5, on the lines (23) and (24), at the channel time slot $tx$, column (5);

The channel codes concerning the connection (R$n$–C$o$) have been shifted from the line $x$ to the line $y$ in MCT–R$n$ and MCT–C$o$. These codes are located, in FIGURE 5, on the lines (24) and (25) at the channel time slot $ty$, column (5);

The two channel codes related to the connection (R$n$–C$p$) are stored, the first one on the line $x$ of MCT–R$n$—line (25)—and the second one, on the line $y$ of MCT–C$p$—line (26).

This connection can thus no more be set up and it will be noted that the code positions in the time path stores are similar to those occupied by the channel codes of the new connection at the beginning of the rearrangement (phase AI). These codes have been bracketed on the figure and linked together by an interrupted line in order to show up these particular positions similar to those occupied by the codes (R$o$–C$o$) and (R$o$–C$o$) at the end of the phase AI.

These various modifications of positions of channel codes in the time path stores must be reflected in the space path stores.

It is the reason why the second operation of the time AII–3 comprises a selection of MCS–R$o$ for transferring the code C$o$ stored in the register 313—line (33)—on the line $x$ of this store so that the new connection may be established from the next frame period on.

The third operation of the time AII–3 comprises a selection of MCS–R$n$. This selection enables the performance:

Of the cancellation of the code C$o$ on the line $x$ by writing the zero code at this location — line (22) — channel time slot $tx$, column (5).

Of the writing of the C$o$ on the line $y$ which provokes the cancellation of the code C$p$—line (22)—channel time slot $ty$, column (5).

It is thus seen, by examining the column (5), first, that all the instructions necessary for the setting up of the connection (R$n$–C$o$) are now stored on the line $y$ of the considered stores, and second, that the line $x$ of MCS–R$n$ contains the zero code so that the connection (R$n$–C$p$) whose channel codes are stored, in the time path stores, on different lines can no more be set up.

It will be noted that, at the end of this phase AII–3, the distribution of the codes on the lines $x$ and $y$ of the space path stores concerned by the rearrangement is similar to the distribution found at the end of the phase AI. Thus, the line $x$ of MCS–R$n$ contains now the zero code whereas it was the line $x$ of MCS–R$o$ which contains formerly the zero code.

This elementary rearrangement operation, which has just been studied was initiated because the code C$o$ was already stored on the line $x$ assigned to the new connection and it ends on the fact that, the new connection being set up in $tx$, a code C$p$ is brought back on this line. Since it is possible that this code be already placed on the line $x$ of a space path store MCS–R$v$, one may possibly be brought to perform a new rearrangement operation for which all the data occupy already, in the path stores, locations which enable to consider that a new connection has to be set up once again, i. e. the connection (R$n$–C$p$). It will then be sufficient to start over a new cycle of time signal 1 to 4 of the phase AII during which one will search in particular, for the code of the trunk R$v$ and for the code C$z$ of a trunk which may be in connection, in $ty$, with the said trunk R$v$.

One will now examine the process of connections setting up after the modifications effected during this time AII–3.

It has been seen previously that the transfer of data between data stores as well as the selection of a crosspoint was carried out by the interpretation of the codes extracted from the path stores and which were stored, during the whole duration of the channel time slot of the connection setting up, in special registers. In the switching stage 99 of the FIGURE 2, these registers are referenced 105 and 125 for those associated with the time path stores and 104 for that associated to the space path store.

The codes are available in the registers since the very beginning of channel time slot (see description of the FIGURE 4) so that, whichever may be the code modification operations carried out during said channel time slot, the data transfer between incoming line stores and outgoing line stores and the selection of the cross point are carried out according to previous instructions.

It has also been seen during the study of the FIGURE 4 that, in order to cancel a code on a line, it was sufficient to prevent its rewriting after its storage in the register associated to the store.

In AII–2 and in AII–3, the connection (R$n$–C$o$) is established in $tx$. At the following time AII–4, it will be established in $ty$.

In AII–2 and in AII–3, the connection (R$n$–C$p$) is established in $ty$. At the following time, since the code C$p$ has been cancelled in MCS–R$n$, this connection will be broken.

Last, it will be possible to set up the connection (R$o$–C$o$) from the following frame period on, all its codes being in place. It is thus seen that, from the end of the time AII–3 on, the connection (R$n$–C$p$) is broken and the connection (R$o$–C$o$) is established.

The new rearrangement operation concerning (R$n$–C$p$) must take a certain time since it is identical to that just described, so that this connection will be established, since the beginning of the time AII–4, through a by-pass connection circuit and this up to the time where it may be reset, i.e. up to the end of the next time AII–3. This by-pass of the connection will thus last one rearrangement cycle.

By examining the distribution of the channel codes (R$n$–C$p$) and (R$n$–C$p$) in the time path stores—lines (25) and (26), column (6) of FIGURE 5—it is seen that the selection of the locations in the data stores is carried out in $tx$ in the trunk R$n$, and in $ty$ in the trunk C$p$. In order to achieve in a correct way the bidirectional transfer of data between data stores of incoming and outgoing lines, it will thus be necessary to provide for buffer stores in the by-pass connection circuit.

The last time AII–4 of a rearrangement operation starts at the latest in $t25.3$ and lasts one frame period.

It comprises three distinct operations which develop at different time slots:

Establishment of the connection (R$n$–C$p$) through the by-pass connection circuit;

Transfer in the registers 313 and 317 of the codes of the new connection to be set up;

Detection of end of rearrangement.

The operation of connection by-pass comprises a selection, from the time slot AII–4.$t$25.8 on, of the outputs R$n$ and C$p$ of the switch so that the connection (R$n$–C$p$) is set up through the by-pass connection circuit up at the end of the next time AII–3.

The transfer operation of the codes R$n$ and C$p$ in the registers 317 and 313 is carried out at the channel time slot AII–4.$t$10, these registers being cleared in AII–4.$t$8.

Last, the detection of the end of rearrangement takes place a certain time after this transfer, i.e. in AII–4.$t$25. It takes place in two different cases:

If the register 317 is clear, i.e. if no code R$n$ has been detected during the data search of the time AII–1;

If the register 313 is clear, i.e. if a code C$p$ has not been found in AII–2 on the line $y$ of MCS–R$n$.

The detection of the absence of at least one of these codes means that no connection (R$n$–C$p$) exists which, starting from the time AII–4, should have been forwarded through the by-pass connection circuit. There is obviously no code (R$n$–C$p$) on the line $x$ of MCT–R$n$, so that there remains no more operation to be carried out and one may shift to the phase $AIII=F$.

When a code R$n$ has not been detected in AII–1, one shifts to AII–2, when the row trunk code generator, having selected all the trunks, shows the zero code. In AII–2, there is neither a search of code C$p$ nor a selection of MCT–R$n$ and of MCT–C$p$, and the channel code (R$o$–C$o$) is transferred in the register 336B in order to be stored on the line $x$ of MCT–C$o$ in AII–3.$tx$.

When a code C$p$ has not been detected in AII–2, and obviously in the case when the code R$n$ is different from zero, there is no channel code (R$n$–C$p$) in MCT–R$n$. The connection (R$n$–C$o$) is transferred from $tx$ to $ty$ and the channel Code (R$o$–C$o$) from $ty$ to $tx$.

If an end of rearrangement has not been detected, i.e., if the codes R$n$ and C$p$ are different from zero, one shifts back to AII–1 and a new elementary rearrangement operation takes place.

Therefore, a phase AI is carried out only if an order A is received directly from the common control circuit. This order is accompanied by the initial data necessary for the performance of this phase AI (writing of the codes in the path stores). A first rearrangement operation takes place afterwards under the control of the time signals AII–1 to AII–4. It will be noted that, in this case, the new connection is not forwarded by the by-pass connection circuit and that the communication is established, through the switch 100 (FIGURE 2), only from the time AII–4 on.

When a common free time position $tC$ has been shown out in EII, the operations of connection setting up are performed in the same way as in the example described in relation with the FIGURE 5. In this case, one has:

$$tx = ty = tC$$

and:

$$\text{code } Rn = 0; \text{ code } Cp = 0$$

Therefore, the stores MCS–R$n$ and MCT–R$n$ are not selected and the code (R$o$–C$o$) is extracted in AII–2.$tC$ from MCT–C$o$ in order to be rewritten in AII–3.$tC$. The writing of the channel codes in AI and of the column trunk code C$o$ in AII–3 is carried out at the channel time slot $tC$.

It is thus seen that, in this case, a first elementary rearrangement operation is performed, at the end of which, in AII–4, the two criteria of end of rearrangement are simultaneously detected so that one shifts to $AIII=F$.

The development of the operations necessary for the setting up of a new connection (R$o$–C$o$) for which, in the course of the phase EII, channel time slots $tx$ and $ty$ which are not identical have been put in evidence, can be summarized in the following way.

During the phase AI the channel codes (R$o$–C$o$) and (R$o$–C$o$) are stored respectively on the line $x$ of MCT–R$o$ and on the line $y$ of MCT–C$o$;

During the time AII–1, one searches the code of a trunk R$n$ which may be connected, in $tx$, with the trunk C$o$. The presence of this code characterizes the existence of a connection (R$n$–C$o$) which sets up in $tx$ and the code R$n$ is stored. During the times AII–2 and AII–3, the following operations are carried out:

Search of the code of a trunk C$p$ which may be connected in $ty$, with the trunk R$n$.

The presence of this code characterizes the existence of a connection (R$n$–C$p$) which sets up in $ty$ and the code C$p$ is stored.

Shifting from $tx$ to $ty$ of the time of setting up of the connection (R$n$–C$o$) by modification, in the path stores of these trunks, of the locations in which are stored the channel and trunk codes.

Preparation, first, of the breaking of the connection (R$n$–C$p$) by cancellation of the code C$p$ on the line $y$ of MCS–R$n$, and second, of a new rearrangement operation by the transfer of the channel code (R$n$–C$p$) from the line $y$ to the line $x$ in MCT–R$n$.

Transfer of the code (R$o$–C$o$) from the line $y$ to the line $x$ in MCT–C$o$ and writing of the code C$o$ on the line $x$ of MCS–R$o$.

Between the beginning of the phase AI and the end of the time AII–3, the communications related to the connections (R$n$–C$o$) and (R$n$–C$p$) flow respectively in $tx$ and $ty$ (i.e. without modification with respect to the initial state) and the connection (R$o$–C$o$) is not set up.

From the beginning of the time AII–4 on, the connection (R$o$–C$o$) is set up in $tx$, the connection (R$n$–C$o$) is set up in $ty$ and the connection (R$n$–C$p$) is set up through the by-pass connection circuit.

If the codes R$n$ and C$p$ both exist, a new rearrangement cycle AII–1 to AII–4 is initiated in which the connection (R$n$–C$p$) is treated like a new connection whose channel codes, in MCT–R$n$ and MCT–C$p$, are stored respectively in the lines $x$ and $y$, in the same way as the channel codes of the connection (R$o$–C$o$) at the end of the time AI.

If at a time AII–4, the absence of one at least of the codes R$n$ or C$p$ is detected, the rearrangement is completed and a signal F is elaborated.

It has just been seen that a rearrangement operation was always followed by a similar operation unless one of the end of rearrangement criteria be detected.

This succession of operations is obviously valid only if it may be proved that a criterion of end of rearrangement will be detected after a limited number of rearrangements. This demonstration will be made in three steps:

First, it will be shown, in relation with FIGURE 6, that no more permutation of the time of connection setting up is carried out in a space path store which has already been submitted once to this operation.

FIGURE 6 represents the codes stored on the lines $x$ and $y$ of two stores MCS–R4 and MCS–R7, and it will be assumed that a rearrangement has just been carried out with permutation in MCS–R7. The new connection to be set up is thus (R7–C3) and a permutation must be made in MCS–R4 between the codes C3 and C9.

But this couple of codes could not have been permutated previously, since in this case, before the permutation in MCS–R7, the code C3 would have been on the line $y$ of two different stores, that being impossible from the very definition of $ty$.

In the configuration shown in this figure, if the connection (R4–C3) does not exist, the code R4, is not found during the following rearrangement and the first criterion of end of rearrangement is detected in AII–4.

This corresponds, in the representation of the FIGURE 6, to the absence of the code C3 on the line $x$ of MCS–R4. In the same way, if the connection (R4–C9) does not exist, the second criterion is detected, which corresponds to the presence of a zero code on the line $y$ of MCS–R4.

Second, it will be shown, by using the previous proposition, that no permutation at all is carried out in the space path store referenced MCS–R$o$ during the first rearrangement operation. If it is assumed that a code R$n$ has been detected, this means that, at the following operation, the code C$o$ will be transferred from the line $x$ to the line $y$ of MCS–R$n$ and that no more permutation will be carried out in this space path store. The code C$o$ will be found only once on the line $x$—connection (R$o$–C$o$)—and, since one will no more operate on MCS–R$n$, this code could no more be stored on the line $x$ of this store. Therefore, there will be no permutation to be carried out in this store which has been referenced MCS–R$o$ in the course of the first rearrangement operation.

Third, it will be shown, by using the first proportion that the number of rearrangements is limited.

If $n1 > n2$, one is assured that at least one of the two cases studied in the first proposition will appear after a certain number of rearrangements since there are more space path stores available than there are different column trunk codes.

If $n1 = n2$, the same will happen since by definition of $ty$, one of the column trunk codes was not initially on the line $y$ of any of the space path stores, i.e. that there was a zero code on the line $y$ of at least one of the space path stores. It will be observed, that in the course of a given rearrangement operation, a zero code is stored on the line $x$ of MCS–R$o$ but, since this location is reserved to the connection (R$n$–C$p$) which passes through the by-pass connection circuit, it cannot be considered as free.

If $n2 > n1$, and in a limit case, column trunk codes are stored on the lines $x$ and $y$ of all the space path stores.

One has shown, FIGURE 7, the case when permutations have taken place in all the space path stores with the exception of MCS–R10, and when the lines $x$ and $y$ of this store contain number codes. A permutation has just taken place in MCS–R8, the connection (R8–C4) being now established in $ty$ and the connection (R8–C6) being forwarded through the connection by-pass circuit. Since no permutation has yet been carried out in MCS–R10, this means that the code C8 is not stored on the line $x$ of any space path store. Effectively, in the opposite case, the configuration shown on the figure would have been obtained after a permutation in MCS–R10.

Therefore, after the permutation in MCS–R8 a new rearrangement operation takes place, in which R$n$=R10 and C$p$=C8. From the time AII–4 of this operation, the connection (R10–C8) sets up through the by-pass connection circuit. During the following rearrangement operation, one does not find, in particular, an R$n$ code since it has just been seen that the code C8 was not located on any line $x$ and the rearrangement is completed.

The number of rearrangements is thus limited and it results from the second and third propositions that it is at most equal to $n1-1$.

Figure 8:
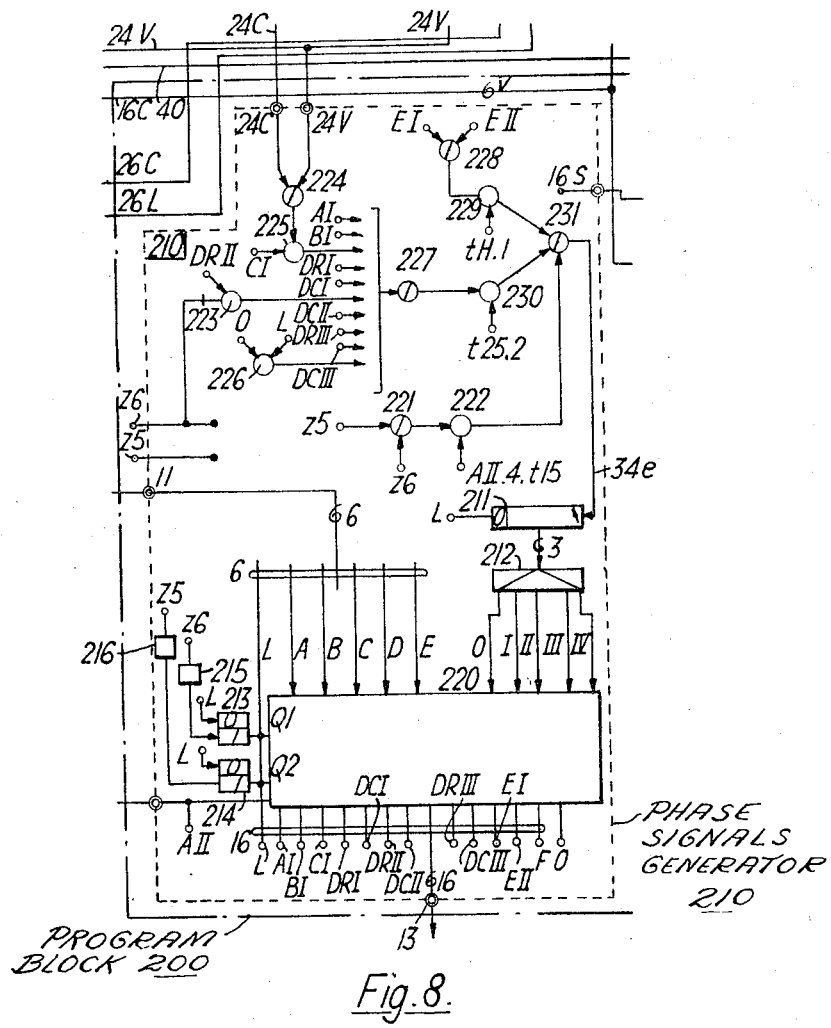
FIGURE 8 shows the detailed diagram of the phase signals generator.
Figure 9:
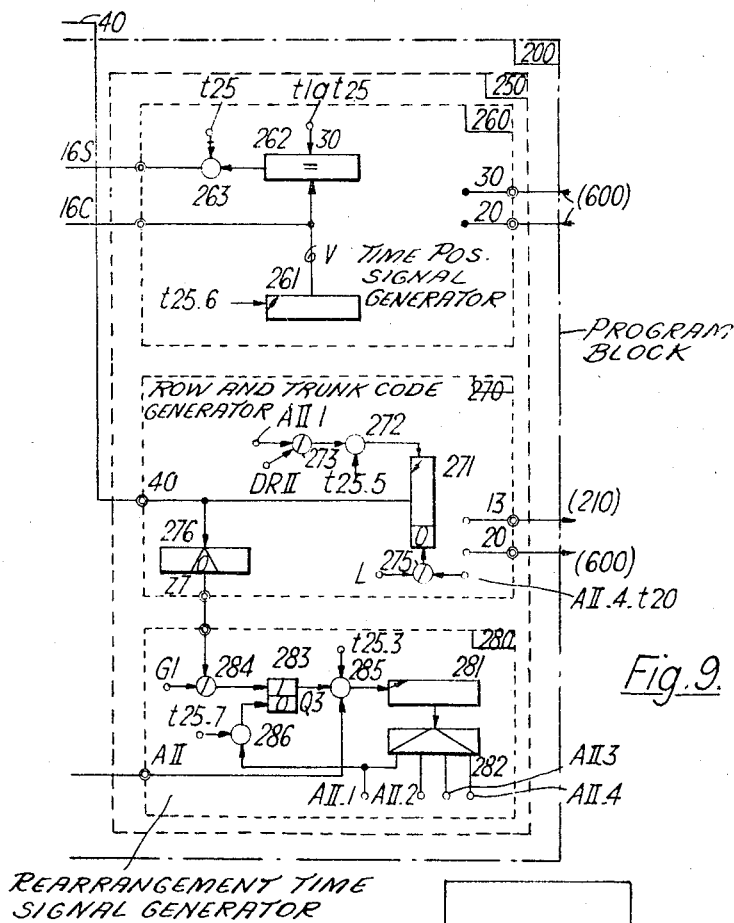
FIGURE 9 shows the detailed diagram of the group of ancillary circuits.

FIGURES 8 and 9 represent the detailed diagram of the phase signals generator 210 and of the group of ancillary circuits the whole of which constitutes the programming block 200.

The phase signals generator 210 shown on FIGURE 8 and which receives the group of six conductors 11, the elementary orders A, B, C, D, E and L transmitted by the common control circuit 499, will be first described. The conductors assigned to the orders A, B, C, D and E are connected to five of the inputs of the logical block 220.

On the other hand, the selector constituted by the counter 211 reset to zero by an order L and by the decoder 212, delivers the phase signals 0, I, II, III and IV.

The signals delivered by this decoder 212 are also applied to the logical block 220 which receives besides signals delivered by two flip-flops 213 and 214.

If Q1 and Q2 designate the logical conditions characterizing the fact that these flip-flops are in the 1 state, Z6 and Z5 the logical conditions characterizing the fact that two of the registers of the block 310, FIGURE 3, are clear (the part of these registers will be precised further on) one may write: $Q1=\overline{Z6}$ and $Q2=\overline{Z5}$ (inverters and 215 and 216).

These conditions are present up to the time when an order L is received which resets the flip-flops to the 0 state and one has the conditions $\overline{Q1}$ and $\overline{Q2}$.

The circuits placed in the logical block enable to obtain the following signals on the outputs:

$A \times I = AI$      $A \times II = AII$
$B \times I = BI$      $C \times I = CI$
$D \times I \times Q1 = DCI$      $D \times I \times Q2 = DRI$
$D \times II \times Q1 = DCII$      $D \times II \times Q2 = DRII$
$E \times I = EI$      $E \times II = EII$
$D \times III \times Q1 = DCIII$      $D \times III \times Q2 = DRIII$ $$A \times III + B \times II + C \times II + D \times IV = F \qquad (1)$$

The advance signals for the counter 211 are applied to its input 34$e$ and are supplied by the logical circuits 221 to 231. These signals will be referenced $e$, each signal $e$ forcing the counter to advance by one position.

One will only describe the elaboration conditions of these signals and the reasons of the choice of the times will be explicited during the general description of the operation of the order execution block 200.

Before sending an operation order to the phase signals generator 210 the circuit receives, from the common control circuit 499, an order L which resets the counter 211 in the position 0. This order L is cancelled only when an operation order is received: one is then in the condition $0 \times \overline{L}$.

This condition energizes the AND circuit 226 which sends a signal $e$ to the counter 211 at the time $t25.2$ (logical circuits 227, 230, 231). It is thus seen that the phase signals AI, BI, CI, DCI, DRI and EI are set up for the condition $0 \times \overline{L} \times t25.2$.

One will now describe the advancing of the counter 211 for the other phases of each one of the operation orders.

When the signal AI is present, one has $AI \times t25.2 = e$ (logical circuits 227, 230, 231), the counter 211 advances to the position II and a signal appears on the output AII of the block 220. One has then $(Z5 + Z6) \times 4.t15 = e$ (logical circuits 221, 222, 231), the counter 211 advances in position III and, according to the Equation 1, the logical block 220 delivers a signal F. (The signal $4.t15$ is a channel time slot signal $t15$ appearing during a time 4 of the phase AII. This signal is elaborated in the group of ancillary circuits which will be described later on.)

When the signal BI is present, one has $BI \times t25.2 = e$ (logical circuits 227, 230, 231), the counter 211 advances in position II and, according to Equation 1, the block 220 delivers a signal F.

When the signal CI is present, one has, if VL and OC designate signals applied to the inputs 24V and 24C, $(VL + OC) \times CI \times t25.2 = e$ (logical circuits 224, 225, 227, 230, 231) and the counter 211 advances to the position II and the block 220 delivers a signal F.

When the common control circuit delivers the order D it has been seen that, when the counter was in position I, the block 220 delivered a signal DCI or DRI according to which of the conditions Q1 or Q2 was present. One has afterwards $(DCI + DRI) \times t25.2 = e$. The counter advances to the position II and the block 220 delivers one of the signals DCII or DRII according to which of the conditions Q1 or Q2 is present. One has afterwards: $(DCII + DRII \times \overline{Z6}) \times t25.2 = e$ (logical circuits 223, 227, 230, 231), the counter 211 advances to the position III and the block 220 delivers a signal on one of its outputs DCIII or DRIII according to which of the conditions Q1 or Q2 is present. One has afterwards: $(DCIII + DRIII) \times t25.2 = e$ (logical circuits 227, 230, 231). The counter 211 advances to the position IV and, according to Equation 1, the block 220 delivers a signal F.

Last, when the signal EI is set up, one has $EI \times tH.1 = e$ (logical circuits 228, 229, 231) and the block 220 delivers a signal on its output EII. One has afterwards: $EII \times tH.1 = e$ (same logical circuits as previously) and the block 220 delivers a signal on its output F. (The signal $tH$ is a signal elaborated in the group of ancillary circuits 250.)

It will be assumed that the counter 211, the decoder 212, and the logical block 220 operate sufficiently fast so that a phase signal starts, at the latest, one digit time slot after the time of activation of one of the AND circuits 222, 229, 230.

FIGURE 9 represents the detailed diagram of the generator of variable time position signals 260 and of the generator of row trunk codes 270 and of the generator of rearrangement time signals 280 which constitute the group of ancillary circuits 250.

The circuit 260 comprises the 25 positions counter 261 which advances by one position at each digit time slot $t25.6$ and shows out a succession of codes identical to the succession of the channel time slot codes elaborated by the clock 600 and the comparator 262 which comprises the code shown out in this counter with the channel time slot codes received from the clock 600 on the group of conductors 30. An AND circuit 263, inhibited in $t25$, prevents the apparition of a time signal $tH$ during this channel time slot.

Since the counter 261 advances by one position at each frame period, the time signal $tH$ delivered by the comparator on the conductor 16S occupies successively all the channel time slots. Thus, if the counter is in the position $t1$, at the first frame period, the coincidence with the codes received from the clock occurs in $t1$ and one has $tH = t1$, this signal $tH$ having a duration of one channel time slot. At the second frame period, one has $tH = t2$, at the third, $tH = t3$, etc. The codes $tH$ are available on the group of conductors 16C.

The circuit 270 comprises a counter 271 which advances by one position at each signal delivered by the AND circuit 272. This latter receives signals from the OR circuit 273 and it is activated for the logical condition:

(AII-1 + DRII) $\times t25.5$. In this expression, AII-1 characterizes a time signal in the phase AII, the utilization of which has been seen during the study of the rearrangement and which is supplied by the circuit 280.

The counter 271 shows out successively all the row trunk codes which are transmitted, on the group of conductors 40, to the circuit 410 (FIGURE 10) so that, at each frame period during the time AII-1 and the phase DRII, a different row trunk is selected for a data search or for a code modification. On the other hand, this code is stored, at the end of certain operations, in the register 317 of the block 310 (FIGURE 13) as it has been seen during the description of the principle of the rearrangement and of the execution of the path identification order. This counter 271 is reset to zero by each signal delivered by the AND circuit 275 which is activated for the logical condition (L + 4.$t20$). In this expression L is the liberation order for the marker and 4.$t20$ characterizes the channel time slot $t20$ of the time AII-4.

Last, a decoder 276 connected to the group of conductors 40 delivers a signal Z7 when the counter shows the zero code.

The generator of rearrangement time signals 280 comprises a four position selector which shows out the times 1, 2, 3, 4 of the phase AII assigned to the rearrangement. This selector comprises a decoder 282 associated with a counter 281 which advances by one position at each signal delivered by the AND circuit 285 and in which the code 1 follows the code 4. This AND circuit is activated by the logical condition AII $\times$ Q3 $\times t25.3$, Q3 being a signal characterizing the fact that a flip-flop 283 is in the 1 state.

The inputs 1 and 0 of this flip-flop are respectively connected to the output of the OR circuit 284 and to the output of the AND circuit 286 so that one may write:

$$Q3 = G1 + Z7$$
$$\overline{Q3} = AII\text{-}1 \times t25.7$$

As it has been seen during the study of the rearrangement principle, G1 is a signal which characterizes the detection, during the time AII-1, of a row trunk code $Rn$. It has also been seen that, when a code $Rn$ is not detected during this operation, the generator of row trunk codes 270 shows out the zero code, i.e. that the decoder 276 delivers a signal Z7. The elaboration of the time signals AII-1 to AII-4 is thus carried out as follows. Before the reception of an order A, an order L has reset to zero the counter 271 so that the decoder 276 delivers a signal Z7 which sets the flip-flop 283 in the 1 state. When the phase signals generator 210 delivers a signal AII, this happening at latest at the time $t25.3$, the AND circuit 285 delivers a signal which sets the counter 281 to the position AII-1. The counter 271 receives then an advance signal in $t25.5$ and it stores a number code so that the signal Z7 which imposed the setting to the 1 state of the flip-flop 283 is suppressed.

In $t25.7$ the AND circuit 286 is activated and the signal it delivers resets the flip-flop 283 to the 0 state. It has been seen previously that the duration of this time signal AII-1 was variable: effectively as soon as a signal G1 appears, the flip-flop 283 sets to the 1 state and, at the following time $t25.3$, the AND circuit 285 transmits an advance signal to the counter 281 which delivers the time signal AII-2. If this signal does not appear, the counter advances under the control of a signal Z7 characterizing the fact that the counter 271 shows once again the zero code after having selected successively the $n1$ row trunks.

The other time signals last only one frame period and, since the OR circuit 284 delivers at each frame period a signal during at least the channel time slot $tx$ (AND circuit 298, FIGURE 10), the flip-flop 283 remains permanently in the 1 state so that the counter advances by one position at each time $t25.3$. At the time $t25.3$ which follows the establishment of the time 4, an advance signal shifts it to the position 1 unless the detection of a criterion of end of rearrangement at the channel time slot $t15$ of this time 4 has provoked previously, as it has been seen during the study of the circuit 210, the elaboration of a signal F so that the input AII of the AND circuit 285 is no more activated.

The operations which are performed in the marker circuit are conrolled by basic orders elaborated in the common control circuit 499 (FIGURES 3 and 13) in accordance with informations received, first from circuits outside those described (call detectors, registers, etc.) or associated circuits, and second, from the marker circuit itself.

The FIGURES 2, 10, 11, 12 and 13, represent the diagram of the whole of the connection control circuits and of the switching stage.

FIGURE 2 comprises from top to bottom:

The switching stage 99 which has been described previously and of which the circuits related to a connection alone have been represented in a diagrammatic way;

The switching stage selection circuit 480 belonging to the marker circuit.

Figure 10:
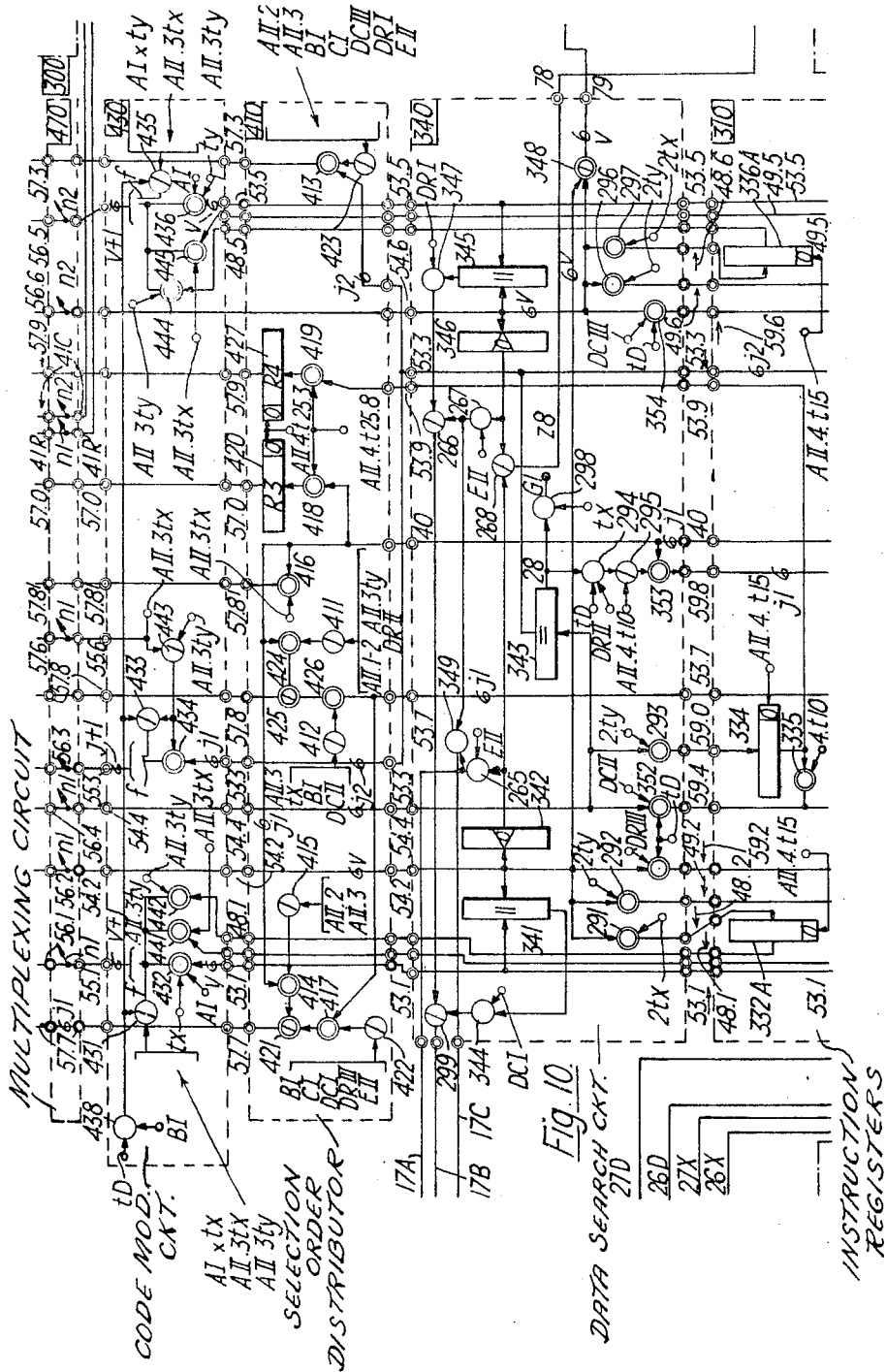
FIGURE 10 shows from top to bottom: the multiplexing circuit, the code modification circuit, the selection order distributor, the data search common circuit, and a part of the group of instruction registers of the marking stage.

FIGURE 10, which matches with the preceding one, comprises from top to bottom:

The multiplexing circuit 470;
The code modification circuit 430;
The selection order distributor 410;
The group of the data search common circuits 340;
A part of group of instruction registers 310 of the marker circuit.

The whole of the circuits 480, 470, 430 and 410 constitutes the block 400 of the access circuits to the switching stage.

Figure 11:
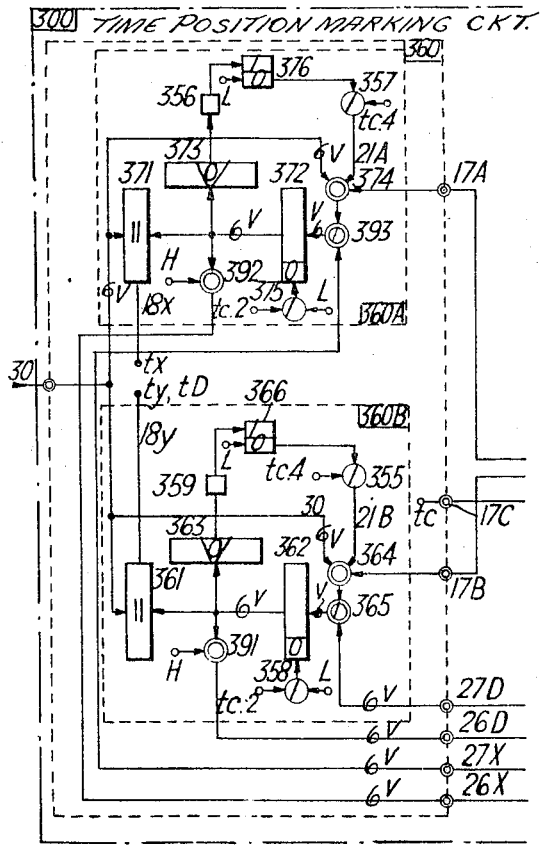
FIGURE 11 shows the detailed diagram of the time position marking circuit.

FIGURE 11 which matches with the FIGURE 10 represents the time position marking circuit 360.

Figure 12:
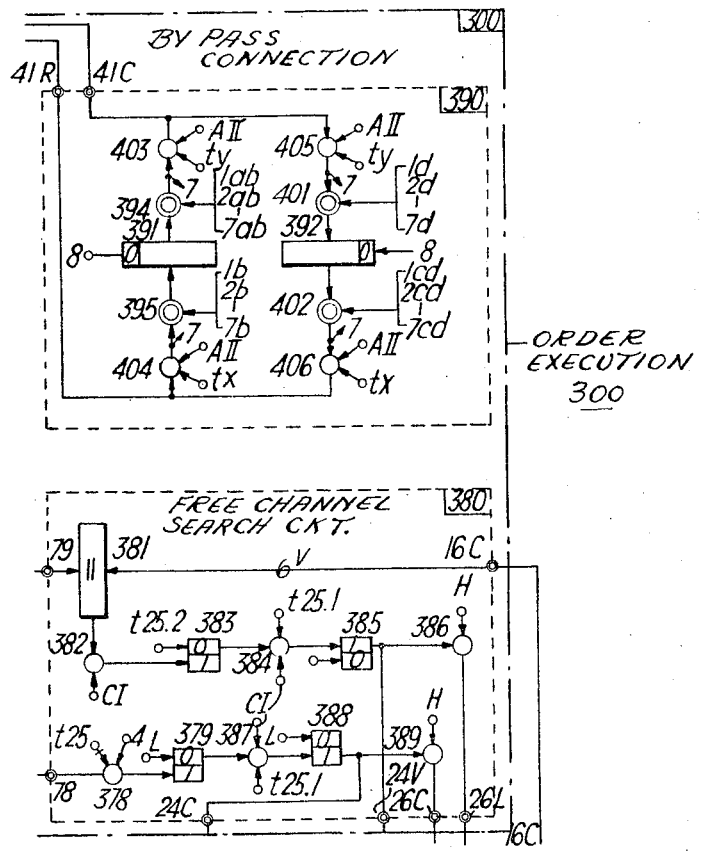
FIGURE 12 shows the detailed diagram of the by-pass connection circuit and of the free channel search circuit.

FIGURE 12 which matches with the FIGURE 10 comprises from top to bottom:

The by-pass connection circuit 390;
The free channel search circuit 380.

The whole of the circuits 340, 360 and 380 constitutes the block 350 of the data search circuits.

Figure 13:
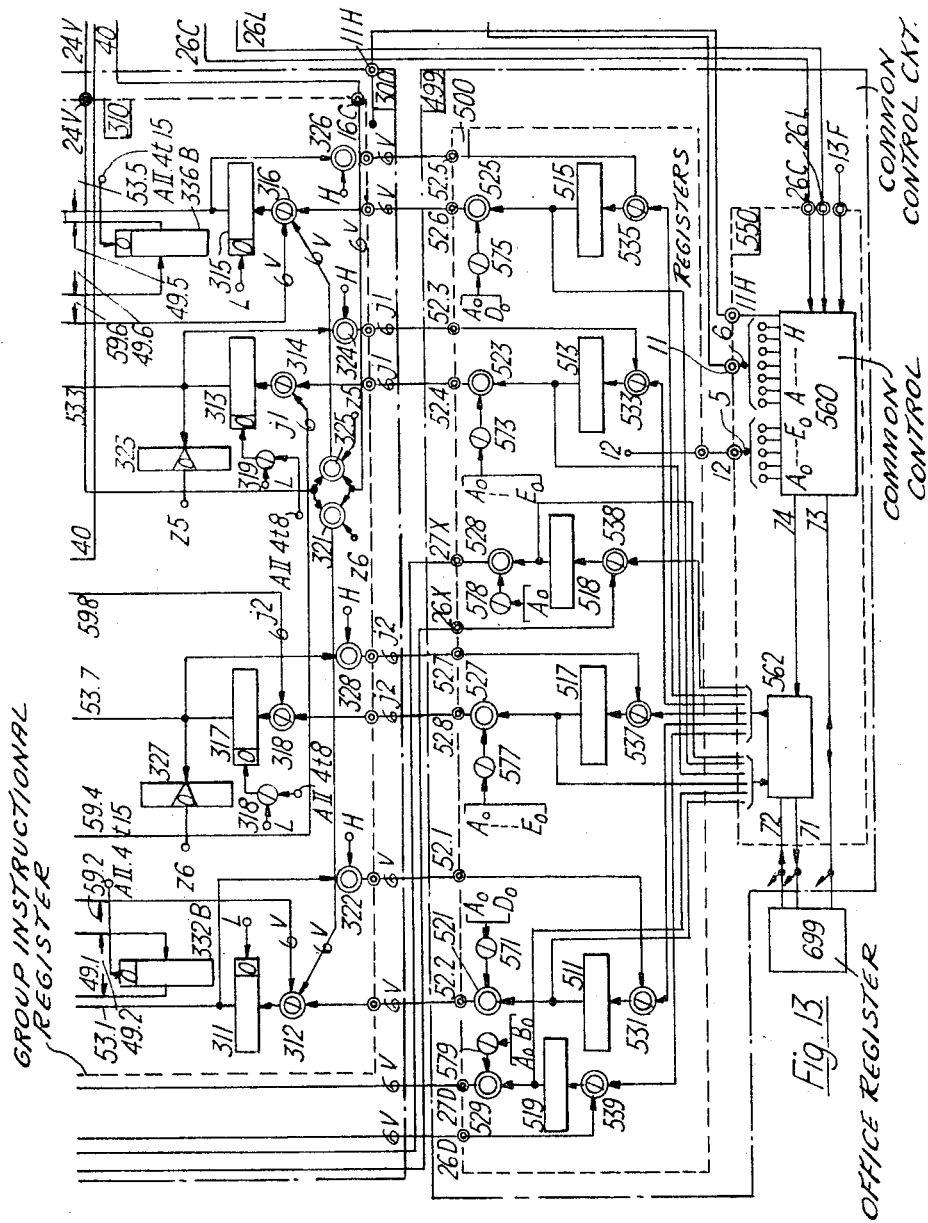
FIGURE 13 shows from top to bottom: a part of the group of instruction registers of the marking stage, the group of registers and the group of the control circuits of the common control circuit, the group of the associated circuits to the common control circuit.

FIGURE 13 which matches with FIGURE 10 comprises from top to bottom:

A part of group of instruction registers 310 of the marker circuit;
A part of the common control circuit 499, i.e. the group of registers 500 and the group of logical circuits;
The group 699 of the circuits associated to the common control circuit.

FIGURE 14 represents the assembly diagram of the FIGURES 2, 8, 9, 10, 11, 12 and 13.

The blocks 210 (FIGURE 8) and 250 (FIGURE 9) constitute the programming block 200; the circuits 310, 340, 360, 380, 390, 410, 430, 470 and 480 constitute the order execution block 300 and the marker circuit 199 is constituted by the grouping of these block 200 and 300.

In the FIGURES 2, 10 and 13, the circuits enabling the transfer of codes between, first, the block 310 (FIGURE 13) and the switching stage 99 (FIGURE 2), and second, the block 300 and the common control circuit 499 have been grouped, this transfer being carried out in the two directions.

FIGURE 15 represents a diagrammatic view of the circuits of the FIGURES 10 and 13, on which have been mentioned, symbolically, the reference numbers assigned to the groups of conductors connecting the different blocks and circuits.

In the block 310, the registers 311 and 315 are assigned respectively to the storage of the codes VR and VC and are reset to zero by an order L. The registers 317 and 313 are assigned respectively to the storage of the codes JR and JC and are reset to zero by the logical condition (L + 4.t8) through respectively the OR circuits 318 and 319.

One will now describe the mode of elaboration of the elementary orders in the common control circuit 499 (FIGURE 13).

The registers 511, 513, 515, 517 and 519 of the circuit 499 are used for storing information coming from an associated circuit and they are used, in particular to store the informations for the marker circuit as well as the results received from said marker when it has completed one operation. The associated circuits such as the call registers used for receiving, from the calling subscriber, the number of the called subscriber or the sender-receiver circuits used for exchanging informations with other switching stages located, for instance, in other exchange offices, have been shown diagrammatically in 699. These associated circuits may transmit or receive, for instance from the circuit 550, data (over the groups of conductors 71 and 72) or service informations (through the group of conductors 73). It will be assumed, by way of example, that the transfer of data between the associated circuits and the registers 511, 513, 515, 517 and 519 is carried out by means of a switching circuit, shown diagrammatically in 562, such a circuit being controlled by the logical block 560 (through the group of conductors 74) which exchanges service informations with the auxiliary circuits over the group of conductors 73. The marker circuit is treated by the common control circuit from the point of view of data transfer and service information transfer, in the same way as an associated circuit. However, in order to make more explicit the explanation of the following operations carried out by the marker circuit and controlled by the common control circuit in simple cases of telephone exploitation, one has shown: first, the AND circuits 521, 523, 525, 527, 528, 529 which enable the selective control of data transfer towards the marker (as well as the multiple OR circuits 571, 573, 575, 577, 578 and 579 which are associated to them), and second, the OR circuits 531, 533, 535, 537, 538 and 539 which give access to the data registers for the storage. These OR circuits would be normally included in the switching circuit 562.

It is understood that the present invention concerns one switching stage and its associated control circuits. The description of the common control circuit 499 is given, by way of example, to telephone switching. The marker stage performs an operation when it receives from the common control circuit the initial data (on the group of conductors 52P) and the corresponding order signal (on the group of conductors 11). When this operation is completed, it indicates to the common control circuit that the operation is completed (through the conductor 13F), the nature of the result under the form of a service information (through the conductors 26–C and 26–L), and puts at its disposal the obtained data. The common control circuit may thus control the transfer of the results in its registers by sending, to the marker stage, an order H on one of the conductors. This order controls the AND circuits 386 and 389 (FIGURE 12) and 322, 328, 324 and 326 (FIGURE 13). One understands that these AND circuits might have been located in the common control circuit, in which case they would have belonged to the switching circuit 562.

It has been seen, during the study of the phase signals generator 210 (FIGURE 5), that the setting up of the phase I of an order A, B, C, D or E was controlled in $t25.2$, by the activation of the AND circuit 230. It will be assumed that the order elaborated in the block 560 is sent, in $t25.3$ to the generator 210 (over the group of conductors 11). An "auxiliary order," referenced $Ao$ when associated with an order A, etc. is sent—over the group of conductors 12—to the circuit 499 during the time slots $t25.3$ to $t25.6$. This auxiliary order controls the data transfer between the common control circuit and the marker stage, before the setting up of the phase I by activating selectively the AND circuits 521, 523, 525, 527, 528 and 529 (through the associated OR circuits 571, 573, 575, 577, 578 and 579).

As it will appear from the reading of the description the registers 311 and 317 (FIGURE 13) of the marker stage and the homologous registers 511 and 517 of the common control circuit are assigned to the row trunks and the registers 313 and 315 on the one hand, and 513 and 515 on the other hand, are assigned to the column trunks. It will be assumed that the row trunk codes and the column trunk codes are characterized respectively by the value of one or several digits of the code and that the common control circuit can recognize them. The information thus obtained is used, during the reception of a code from an associated circuit, for switching, by means of the circuit 562 (FIGURE 13), the data towards the registers which are assigned to them. It is understood that the information thus elaborated in the common control circuit is identical to that elaborated in the marker circuit by the zero code decoders 327 and 323 (FIGURE 13), i.e. to the signals Z6 and Z5. Identical signals are thus available in the common control circuit and, according to an alternate solution, they might be transmitted to the marker circuit at the same time as the orders A, B, C, D or E. However, the setting into operation of such an alternate solution would bring no modification at all to the operation of the marker circuit.

The circuits constituting the order execution block 300 will be studied now, together with the way according to which the operations controlled by the phase signals are performed therein. Thus, the following circuits will be studied successively:

The switching stage access circuits;

The circuits performing the operations related to the data modifications and to the connection by-pass;

The circuits performing the operations related to the data searches.

As it has been seen previously, the group of the switching stage access circuits comprises the selection order distributor 410 (FIGURE 10), the switching stage selection circuit 480 (FIGURE 2), the code modification circuit 430 and the multiplexing circuit 470 (FIGURE 10).

In the switching stage 99 (FIGURE 2), each one of the row trunks comprises a time path store and a space path store and each one of the column trunk comprises a time path store. Each one of these path stores may receive codes from the marker stage over a group of conductors 58–1, 58–3, 58–5 and may send codes over a group of conductors 58–2, 58–4, 58–6.

Since the marker stage operates with only one trunk of each type at a given time slot, the groups of access conductors to the stores coming from the circuits 430, 340 and 310 are multiplexed in the multiplexing circuit 470.

On each one of the $n1$ groups of conductors 56–1, 56–2, 56–3 and 56–4 a multiple AND circuit has been inserted in the selection circuit 480.

The two multiple AND circuits associated with the time path stores of each one of the row trunks are simultaneously energized, by the application, on a common input, of a signal delivered by a decoder 487. One only of these groups of AND circuits, which are referenced 481 and 482, has been shown on the figure.

The two multiple AND circuits related to the space path stores are energized by a signal delivered by a decoder 497 and are referenced 483 and 484. Besides, a second access to the space path stores is provided by the decoder 490 each one of the outputs of which activates a simple AND circuit similar to that referenced 487 on the FIGURE 2.

On each one of the $n2$ groups of conductors 56–5 and 56–6, one has interposed, in the circuit 480, AND multiple circuits 485 and 486 activated by the application of a signal delivered by a column trunk decoder 488.

On the other hand, the circuit 480 comprises two decoders 498 and 491 which enable the selection respectively of a row of a column in the switch 100 (FIGURE 2) through bidirectional electronic gates interposed on the conductors 41R and 41C, such as those referenced 488 and 489. These gates connect the conductors respectively to the inputs R2 and C3 of the switch.

It has been seen during the description of the FIGURE 3 that the first type of operation carried out under the control of a phase or time signal consisted, in the majority of the cases, in a selection in the switching stage, which involves the selection order distributor 410 (FIGURE 10) and the selection circuit 480 (FIGURE 2). As it has just been seen, the circuit 480 enables to select, in the switching stage 99, either path stores or switch inputs.

The selection of a path store is obtained by the interpretation of one of the following codes:

Row trunk code stored in the register 317 (FIGURE 13) and transmitted on the group of $j1$ conductors 53–7;

Row trunk code supplied by the code generator 270 (FIGURE 9) on the group of $j1$ conductors 40;

Column trunk code stored in the register 313 (FIGURE 13) and transmitted on the group of $j2$ conductors 53–3.

The registers 317 and 313 are reset to zero through the OR circuits 318 and 319 by an order L.

The circuit 410 comprises a certain number of logical circuits controlled by the phase and time signals which send these codes to the decoders 487, 497, 490 and 488 respectively on the group of conductors 57–7, 57–8, 57–8' and 57–3.

The selection of a time space store of row trunk through the decoder 487 (FIGURE 2) is controlled by the AND circuits 414 and 417 and the OR circuits 415, 421, 422. As it has been described at the end of the study of the FIGURE 3, one of these stores is selected during the following phases and times:

In B1, C1, DC1, DRIII and EII by the interpretation of the row trunk code stored in the register 317 (FIGURE 13);

In AII–2, AII–3 and DRII by the interpretation of the row trunk code 40.

The selection of a space path store of row trunk through the decoder 497 (FIGURE 2) is controlled by the AND circuits 424 and 426 and the OR circuits 411, 412, 425. One of these stores is selected during the following phases and times:

In AII–3.$tx$ (which will also be written 3.$tx$, B1, DCII by the interpretation of the row trunk code written in the register 317;

In AII–1, AII–2, AII–3.$ty$ by the interpretation of the code 40.

The selection of a space path store of row trunk through the decoder 490 is controlled by the AND circuit 410 which receives the code 40 at its input and which is activated in 3.$tx$.

The selection of a time space path store of column trunk through the decoder 488 is controlled by the AND circuit 413 and the OR circuit 423. This store is selected in AII–2, AII–3, B1, C1, DCIII, DRI and EII and the code transmitted to the decoder comes from the register 313.

The selection of an input of the switch 100 (FIGURE 2) is obtained by the interpretation, in the decoders 498 and 491, of the codes stored respectively in the registers 420 and 427 placed in the circuit 410.

These codes are respectively the code 40 and a code coming from the register 334 placed in the block 310 (FIGURE 10), on the group of conductors 53–9 and they are stored in the registers in 4.$t25.8$ by the activation of the AND multiple circuits 418 and 419.

The different codes used during these selection operations have been given the following references during the study of the rearrangement principle (FIGURE 5):

$Ro$ and $Co$ respectively for the codes stored in the registers 317 and 313 (FIGURE 13);

$Rn$ for the code stored in the register 271 (FIGURE 9) during the times AII–2, AII–3 and AII–4 (this code is available on the group of conductors 40, FIGURES 9, 8, 13 and 10);

$Co$ for the code stored in the registers 334 (FIGURE 10).

The code modification circuit 430 (FIGURE 12) in which are performed the operations related to the code modifications will now be described.

This circuit comprises three groups of logical circuits which control the transfer of the code arriving on the following groups of conductors:

48–1, 49–1 and 53–1 assigned to the time path stores of row trunk;

53–3 assigned to the space path stores;

48–5, 49–5 and 53–5 assigned to the time path stores of row trunk.

The first group of logical circuits comprises the multiple AND circuits 432, 441, 442, and the OR circuit 431; the second group comprises the multiple AND circuit 434 and the OR circuits 433, 443; the third group comprises the multiple AND circuits 436, 444, 445 and the OR circuit 435.

As it has been indicated on the FIGURE 12, the groups of input conductors comprise $v$ or $j1$ conductors according to their assignment whereas the groups of output conductors 55–1, 55–3, 55–5 comprise one more conductor, i.e., $v+1$ or $j1+1$. This additional conductor, which is referenced f on the figure, transmits the code modification signal supplied by the OR circuit to which it is connected (431, 433, 435, when a code modification must be carried out in the selected path store. The way of operation of this signal has been studied in relation with the FIGURE 4.

As it has just been seen during the study of the circuit 410, the code modification operations take place during the phases and times BI, AI and AII–3.

It has also been seen during the study of the rearrangement principle, that the operation performed in AI was the storage of the codes (Ro–Co) and (Ro–Co) in the stores MCT–Ro and MCT–Co respectively in $tx$ and $ty$. These times are delimited by the AND circuits 432 and 436 and the code modification signals are supplied by the OR circuits 431 and 435. These codes (Ro–Co) and (Ro–Co) come respectively from the registers 311 and 315 (FIGURE 10).

The duration of the phase AI is one frame period.

The operation performed in BI is a zero code writing in the path stores of two trunks which are connected at the channel time slot $tD$ and it concerns the breaking of this connection.

For that, the AND circuit 438 delivers a signal for the logical condition BI $x$ $tD$ and this signal is applied to the OR circuits 431, 433, 435 in order to transmit to the selected path stores a code modification signal which will block the rewriting of the code read at this channel time slot.

The duration of the phase BI is one frame period.

Several code modification operations are performed in AII–3. One performs first, the writing of a zero code on the line $tx$ of MCS–R$n$ which consists in preventing the rewriting of the code Co. This store is selected through the decoder 490 and the signal transmitted on the single conductor 55–6 is a code modification signal. Secondly, number codes are written on the lines $x$ or $y$ of certain space and time path stores: thus, the code Co is written on the line $x$ of MCS–Ro and on the line $y$ of MCS–R$n$. This code is supplied by the register 313 (FIGURE 13) on the group of conductors 53–3 by the activation of the multiple AND circuit 434.

On the other hand, codes stored in the registers 332A, 332B, 336A, 336B (FIGURES 12 and 13) are transferred selectively, in $tx$ or in $ty$, to the corresponding lines of the time path stores MCT–R$n$ and MCT–C$o$. These operations constitute the second phase of what has been called, during the study of FIGURE 5, the "code permutation." They will be described further on after the study of the first phase of this code permutation which is a data search operation.

As it has been seen during the study of the rearrangement principle, the connection (R$n$–C$p$) must be by-passed by an external circuit or by-pass connection criuit, between the beginning of the time AII–4 of an elementary rearrangement operation and the end of the time AII–3 of the next one. It will be reminded (see desscription of FIGURE 9) that a phase AI takes place only for the first rearrangement operation and that the time interval which has just been defined corresponds to a phase AII.

It has also been seen during the study of the selection circuits 410 and 480, that the inputs R$n$ and C$p$ of the switch 100 (FIGURE 2) were selected by signals delivered respectively by the decoders 498 and 491 which energized the bidirectional electronic gates 488 and 489. The conductors 41R assigned to the rows and the 41C assigned to the columns are connected to the connection by-pass circuit 390 (FIGURE 12) and the transmission of the messages between incoming line and outgoing line data stores is carried out therein in a bidirectional way and in series form.

It has been seen during the study of the rearrangement principle that at the end of a rearrangement operation, the channel code (R$n$–C$p$) was stored on the line $x$ of MCT–R$n$ and that the channel code (R$n$–C$p$) was stored on the line y of MCT–C$p$. In order to establish the communication related to this connection (R$n$–C$p$) it is thus necessary to write and to read in the data stores of the trunk R$n$ at the time $tx$ and to write and to read in the data stores of the trunk C$p$ at the time $ty$.

In the by-pass connection circuit 390 (FIGURE 12) the shifting of $tx$ to $ty$ and of $ty$ to $tx$ is carried out through respectively the registers 391 and 392. The writing channel time slots are delimited, during the phase AII, by the AND circuits 404 and 405 and the reading channel time slots by the AND circuit 403 and 406.

In $tx$ the message signals circulate between the row trunk and the connection by-pass circuit (AND circuits 404 and 406) and in $ty$, the message signals circulate between the column trunk and the connection by-pass circuit (AND circuits 403 and 405).

The register 391 is assigned to the storage of the message coming in $tx$ from the trunk R$n$ and transmitted in $ty$ towards the trunk C$p$. The register 392 is assigned to the storage of the message coming in $ty$ from the trunk C$p$ and transmitted in $tx$ towards the trunk R$n$.

The writing and the reading of the message signals are carried out through the multiple AND circuits 395, 401 and 394, 402 located on the multiplexed output conductors of the AND circuits 403 and 406. Since a message comprises seven digits, each multiple AND circuit comprises seven single AND circuits. These multiple AND circuits are used to carry out the series-parallel and parallel-series conversion of the messages exchanged between the two trunks. The operation of this device has been described in relation with the FIGURE 1($v$).

The advance signals applied to the AND multiple circuit 395 are the signals $1b$ (basic time slot $b$ of the digit time slot 1), $2b$, $3b$, $4b$, $5b$, $6b$, $7b$, and activation signals are applied to the common input of this circuit when the AND circuit 404 is activated in AII $x$ $tx$. This circuit enables carrying out the series-parallel conversion of the signals arriving on the conductor 41R for their writing in the register 391.

The advance signals applied to the multiple AND circuit 394 are the signals $1ab$ (basic time slots $a$ and $b$ of the digit time slot 1) $2ab$ . . . $7ab$ and the signals read in the register 391 and present on the single output conductor are transmitted on the conductor 41C during the time intreval AII $x$ $ty$ delimited by the AND circuit 403.

The writing and the reading in the register 392 are carried out in a similar way, respectively during the time intervals $1d$ to $7d$ and $1cd$ to $7cd$. These writing and reading time slots in the registers 391 and 392 are coordinated with the writing and reading time slots in the data stores such as they have been stated during the study of FIGURE 2. Thus, for instance, the basic time slots $a$ and $b$ are reserved to the reading of a given message signal in the incoming line data store of the row trunk JAE2 (AND circuit 112, FIGURE 2) and this signal is stored in the register 391 of the connection by-pass circuit at the basic time slot $b$. This message signal is read in $ab$ and it is transferred to the outgoing line data store of the column trunk JAS3 at the basic time slot $b$ (AND circuit 124, FIGURE 2).

The resetting to zero to the registers 391 and 392 is carried out during the digit time slot 8 of each channel time slot during which the register does not receive or send any signal.

The operations related to the data searches are carried out by circuits located in the group of data search circuits 350 which comprises the group of common circuits 340

(FIGURE 10), the time position marking circuit 360 (FIGURE 11) and the free channel search circuit 380 (FIGURE 12).

A data search enables, either to mark a certain channel time slot, or to select a channel or a trunk code received from a path store at a marked channel time slot.

A channel time slot marking, which will be represented symbolically by the letter "M," may be carried out in two different ways referenced M$a$ and M$b$:

M$a$—The codes received from the selected time path store are compared to the code written in one of the registers 311 or 315 of the block 310 and the channel time slot for which the two codes are identical is marked. The identity is detected by one of the comparators 341 or 345 located in the circuit 340 and the marking is performed in the circuit 360 (FIGURE 11). This type of operation is carried out during the phases DHI and DCI and the marked channel time slot is $t$D.

M$b$—The codes received from a time path store are applied to a zero code decoder associated to this store and placed in the block 340. The channel time at which the decoder detects a zero code is marked, this operation taking place in the block 360. This type of operation is carried out during the phase EII, and enables the marking of either a channel time slot $t$C, or of the channel time slots $t$x and $t$y.

The results of these operations M$a$ and M$b$, consist in the repetitive elaboration of a signal during the duration of the marked channel time slot.

It will be noted that, the variable time position signal $t$H, the elaboration of which has been studied in relation with the description of the programming block (circuit 260, FIGURE 9), represents also a marked channel time slot signal characterized by the fact that its time position advances by one position at each frame period.

A selection of channel or trunk code at a marked channel time slot which will be represented symbolically by the letter "K" may be carried out in three different ways referenced K$a$, K$b$ and K$c$:

K$a$—The code stored on the line corresponding to this channel time slot in a time path store or in a space path store is selected and transferred into one of the registers of the block 310. This selection is controlled by the electronic gates 351, 352 and 354 located in the block 340 (FIGURE 10). This type of operation is carried out in the course of the phases DCII, DRIII and DCIII and the marked channel time slot is $t$D.

K$b$—The space path stores of the row trunks being selected cyclically by the row trunk codes delivered on the group of conductors 40 by the circuit 270 (FIGURE 9), the generated codes are compared to that stored in the register 313 (FIGURE 13). The row trunk code giving the identity at the marked channel time slot is transferred into the register 317. This type of operation is performed in the course of the phases DRII and AII–1 at either the channel time slot $t$D, or the channel time slot $t$x.

K$c$—The codes extracted from a time path store are compared to the code of the variable time position signal $t$H in the circuit 380, as long as an identity is not detected during a frame period. The code $t$H utilized during this frame period is transferred in one of the registers 311 or 315. This type of operation is carried out during the phase CI.

The circuits involved during the different data search operations which are performed in the course of certain phases of the orders C, E, D and A will be now described successively in detail.

A first data search operation consists in searching, during the phase CI, for a free channel on the trunk, the code of which is stored in one of the registers 313 or 317 (FIGURE 10).

As it has been seen previously, the application of the phase signal CI to the circuit 410 enables the selection of this trunk. It will be assumed, by way of example, that this search is made in a row trunk.

The codes registered in the time path store of this trunk, are thus transmitted cyclically on the conductors 58–2, 56–2, 54–2 (58–6, 56–6, 54–6 in the case of a column trunk) and appear on the output 79 of the circuit 340 after passage in the multiple OR circuit 348.

On the other hand, these same codes are applied to the zero code decoder 342 (346 in the case of a column trunk) the output signal of which, referenced Z8, appears on the output 78 of the circuit 340 after passage in the OR circuit 268 (the second input of this circuit is connected to the output of the decoder 346).

These signals 78 and 79 are applied to the free channel search circuit 380 (FIGURE 12) and provoke, the first one, the elaboration of an busy signal OC when none of the channels is free on the considered trunk, and the second one, the search of a free channel code and the elaboration of a signal VL as soon as a free channel code has been found.

The mode of elaboration of the signal OC will be first described. The circuit comprises the AND circuits 378, 387 and 389 and the flip-flops 379 and 388. The AND circuit 378 comprises three inputs and it is activated for the logical condition: $Z8 \times \overline{t25} \times 4$ (2) (in this expression the last figure characterizes a digit time slot signal 4). The output of this AND circuit is connected to the input 1 of the flip-flop 379 which is reset to the 0 state by an order L. The first input of the AND circuit 387 is connected to the output 0 of this flip-flop 379, the second and third inputs receive the signals CI and $t25.1$ and its output is connected to the input 1 of the flip-flop 388 reset to the 0 state by an order L. Last, the 1 output of this flip-flop is connected to the AND circuit 389 which is energized by a signal H. Equation 2 shows that the AND circuit 378 is activated at each digit time slot 4 of the channel time slot $t1$ to $t24$. The first signal Z8 appearing during one of these time slots sets the flip-flop 379 in the 1 state.

It has been seen, during the study of the circuit 210 (FIGURE 8), that the signal $e$ controlling the advance of the counter 211 in position I was elaborated in $t25.2$. Since the state of the flip-flop 379 is transmitted to the flip-flop 388 for the logical condition CI $\times$ $t25.1$ (AND circuit 387), it is seen that this operation takes place only at the end of the first frame period of the phase CI.

If the flip-flop 379 is in the 0 state, i.e. if no signal Z8 at all has been received during this frame period—which means that there is no free channel at all on the trunk—the flip-flop 388 sets to the 1 state.

If the flip-flop 379 is in the 1 state, i.e. if at least one signal Z8 has been received during this frame period—which means that there is at least one free channel on the trunk—the flip-flop 388 remains in the 0 state.

The signal OC delivered by the flip-flop 388 when it is in the 1 state at the end if the first time period of the signal CI characterizes thus the fact that all the channels are busy on the trunk. This signal is transmitted to the circuit 210 (FIGURE 8) on the conductor 24C and controls the elaboration of the execution signal F.

The search for a free channel code, which is an operation of the type K$c$, will be now described.

The codes appearing on the input 79 of the circuit 380 (FIGURE 12) are applied to one of the inputs of the comparator 381 which receives the codes $t$H on its second input 16C.

It has been seen during the description of the circuit 250 (FIGURE 9) that the code $t$H advances by one position at each frame period so that it takes successively all the values $t1$ to $t24$ which represent, in the circuit 380, the different channel codes. At each frame period the codes 79, extracted cyclically from the selected time path store, are compared to the code $t$H present during this period. When the comparator 381 delivers a signal, this means that the channel $tH$ is busy since its code is stored in the time path store.

The code $tH$ shown out in a frame period during which comparator has delivered no signal at all is then a free channel code.

The output signal of the comparator, after passage in and AND circuit 382 (FIGURE 12) activated in CI, is applied to the input 1 of the flip-flop 383.

The interval of a frame period is delimited by the signal $t25.2$ which resets this flip-flop to the 0 state and by an AND circuit 384 having one input connected to the 0 output of the flip-flop while the two others receive the signals CI and $t25.1$.

It will be assumed, by way of example, that $tH=t8$.

At the time $t25.5$ of a previous frame period, the flip-flop 383 has been reset to the 0 state. Since the phase signal CI is set up only in $t25.3$, the AND circuit 384 becomes activated only after one frame period. The signal CI controls the selection of the considered trunk and, from the time $t1$ which follows immediately, the channel codes are transmitted on the group of conductors 79. If, in the course of this frame period ($t1$ to $t24$), the code of the channel number 8 appears on the group of conductors 79, the flip-flop 383 sets to the 1 state and, at the following time $t25.1$, no signal at all appears at the output of the AND circuit 384.

On the contrary, if in the course of said frame period, the code of the channel number 8 has not appeared, the flip-flop 383 remains in the 0 state and, at the time $t25.1$ of the same frame period, the AND circuit 384 is activated and a signal is applied to the 1 input of the flip-flop 385. At the time $t25.2$ the flip-flop 383 is reset to the 0 state. At the same time, the flip-flop 385 is in the 1 state, and this state, referenced VL, is transmitted on the conductor 24V, first to the block 310 to control the inscription, in the corresponding channel code register, of the channel time slot code $tH$, and second to the block 210 for controlling the elaboration of the execution signal F.

The inscription is controlled by the multiple AND circuits 321 and 325 placed in the block 310 (FIGURE 13) which receive this signal 24V on one input and the code $tH$ on a second input 16C.

It has been seen, during the study of the circuit 260 (FIGURE 9), that this code $tH$ was modified in $t25.6$. Since the signal 24V is available at the latest from the time $t25.2$ on, it is seen that the code $tH$ with which the comparison has been made is not modified before the time $t25.6$.

This code is thus stored in the channel code register 311 or 317 (FIGURE 13) according to whether the search was carried out in a row trunk or in a column trunk. This condition is shown up by a signal Z6 or Z5 delivered by one of the zero code decoders 327 or 323 placed in the block 310 when no code at all is stored in the associated register.

When a search is carried out in a row trunk, the register 317 contains the code of this trunk and the decoder 327 delivers a signal Z6 which activates the AND circuit 321 enabling the inscription of the free channel code $tH$ in the register 311 when a signal 24V appears. In the same way, during a search in a column trunk, the decoder 323 delivers a signal Z5 which activates the AND circuit 325 for the inscription of the code $tH$ in the register 317 when a signal 24V appears.

The outputs 1 of the flip-flops 388 (signal OC) and 385 (signal VL) are applied to one of the inputs of the AND circuits 389 and 386 which are activated by a signal H. The output conductors 26C and 26L of these AND circuits are connected to the circuit 560 (FIGURE 13).

When one of the two flip-flops 388 or 385 is set to the 1 state (appearance of a signal OC or of a signal VL) an execution order F is elaborated by the circuit 210 and transmitted to the common control circuit 499. The circuit 499 transmits then an order H which is applied to the AND circuits 386 and 389 and the existing condition, VL or OC, is transmitted to the circuit 560.

When there is no free channel at all on the trunk, the duration of the signal CI is of one frame period. When there is at least one free channel, the code search may last from one to $m-1$ frame periods.

A second data search operation consists in marking the channel time slots $tx$ and $ty$ during the phase EII.

As it has been seen during the study of the circuit 210 (FIGURE 8), the phase signal EI is elaborated in $t25.2$ and is only used for enabling to set up the phase EII from the first following time $tH$ on, for reasons that will be explained further on. If for instance $tH=t8$, the phase EII is elaborated in $t8$ and lasts up to $t9$ of the following frame period, since the phase EIII begins also at the time $tH$. The phase EI lasts thus at the maximum one frame period and the phase EII slightly more than a frame period.

The phase EII is the search phase for the free channel time slots $tx$ and $ty$ respectively in the trunks $Ro$ and $Co$ selected through the decoders 487 and 488 (FIGURE 2). It is a data search operation of the type $Mb$. This search is performed in the time position marking circuit 360 (FIGURE 11) which comprises two groups of identical elements referenced 360A (search of $tx$) and 360B (search of $ty$). The group 360B is also used during the performance of an order D of path identification for the search of the channel time slot $tD$.

The circuit 360 comprises the inputs 30 (through which are received the channel time slot codes delivered by the clock 600, FIGURE 3), 17A, 17B, 17C. The signals received on the inputs 17A and 17B initiate the operation of, respectively, the circuits 360A and 360B, and the signal received on the input 17C characterizes the condition $tx=ty$. These three signals are supplied by the data search common circuit 340 (FIGURE 10). In this circuit, the outputs of the zero code detectors 342 and 346 (the inputs of which are connected to the groups of conductors 54-2 and 54-6) are applied respectively to the AND circuits 256 and 267 which are activated in EII. The outputs of these AND circuits are connected to the two inputs of the AND circuit 349 which thus delivers a signal on its output 17C when, at a given channel time slot of the phase EII, the time path stores of the trunks $Ro$ and $Co$ do not simultaneously deliver any code number: this signal which has a duration of one channel time slot, characterizes thus a free channel time slot common to both trunks. On the other hand, the output of the AND circuit 267 is connected to the conductor 17B through the OR circuits 266 and 269 and the output of the AND circuit 265 is connected to the conductor 17A. The OR circuits 266 and 299 comprise one each a second input activated respectively in DRI (AND circuit 347) and in DCI (AND circuit 344). The process of elaboration of the signals applied thereto will be examined during the study of the order D.

The operation of one of the groups of elements of the circuit 360, for instance the group 360B will be described now, assuming first that no signal at all appears on the input 17C.

The signal 17B is applied to one of the inputs of the AND circuit 364 (FIGURE 11) which receives, on a second input, a signal 21B delivered by the flip-flop 366 when in the 0 state (an OR circuit 355 is placed on this conductor) and, on a third input, the channel time slot codes 30 supplied by the clock 600. When the AND circuit is activated, the signals are transmitted by the OR circuit 365 and are stored in the register 362 set previously to zero by the order L.

The code stored in the register 362 is transmitted first, to the zero code detector 363, and second, to one of the inputs of the comparator 361 for comparison with the codes 30 applied to its second input. The output of the decoder 363 is connected to the 1 input of the flip-flop 366 through the inverter 359.

Before the appearance of the order E, the order L resets the register 362 to zero and resets the flip-flop 366 to the 0 state. The decoder 363 delivers then a signal which is inverted by the inverter 359 so that no signal at all is applied on the input 1 of the flip-flop the state of which is not altered. The input 21B of the AND circuit 364 is then permanently activated.

When appears a signal 17B characterizing, during the phase EII, a free channel time slot in the time path store of the trunk Co, the AND circuit 364 is activated and the channel time slot code which is present at this time on the group of conductors 30, is stored in the register 362. The decoder 363 delivers then a signal which, after passage in the inverter 359, sets the flip-flop 366 to the 1 state, so that the AND circuit 364 is blocked up to the next order L. The setting of this flip-flop to the 1 state means that a channel time slot code $ty$ has been stored in the register 362.

The group 360A operates in the same way and enables the writing in the register 372 of a channel time slot code $tx$.

When a signal appears on the input 17C characterizing a common free channel time slot $tC$, this common time position is chosen preferably in order to prevent the performance of rearrangement operations. For that, a signal $tC.2$, applied to the registers 362 and 372, clears the codes $ty$ and $tx$ which could have been stored previously, and a signal $tC.4$ applied to the OR circuits 355 and 357 activates the inputs 21 of the multiple AND circuits 364 and 374. Since the input 17 of these circuits receives also a signal at this channel time slot, the code $tC$ which is present on the group of conductors 30 is stored in the registers 364 and 374.

It will be noted that if, during the frame period, several common free channel time slots exist, only the last one of them will be stored definitely in the registers. The codes definitely stored are transmitted to the common control circuit on the groups of conductors 26D (code $ty$, multiple AND circuit 391) and 26X (code $tx$, multiple AND circuit 392) and respectively stored in the registers 519 and 518 (FIGURE 13). When the next order is A, the multiple AND circuits 529 and 528 located in the common control circuit are activated by the signal Ao (acting through the OR circuits 579 and 578) and these codes are returned to the circuit 360 on the groups of conductors 27D (code $ty$) and 27X (code $tx$). They are stored, after passage in the OR circuits 365 and 393, in the registers 362 and 372 cleared by the order L which has preceded the order A and the comparators 361 and 371 deliver once again signals $ty$ and $tx$ or $tC$ on their outputs 18Y and 18X.

As it has been seen during the study of the rearrangement principle, the channel time slots $tx$ or $tC$ are the flow channel time slots of the new connection (Ro–Co) in the switch 100 (FIGURES 2 and 3). If, for instance, $n1=n2$ the switch will allow the setting up of at most $n1$ connections at any channel time slot. During the successive setting up of a certain number of connections, it will be thus possible for several of them to use the same time $tx$ or $tC$. On the other hand the number of trunks associated with a switching stage is chosen in a way such that each junction has still available, at the busy hour, a certain number of free channels. Thus, there would be a non negligible probability for having the times of setting up of the different connections grouped together around the channel time slot of elaboration of the signal EII, if this latter was fixed. It is the reason why this phase starts in $tH$ so that this time is modified at each frame period. It results therefrom that the choice of the last code of common free channel time slot does not present any inconvenience, the different codes $tC$ used being also distributed randomly.

A third data search operation consists in a path identification under the control of an order D. It has been seen, during the study of the phase signals generator 210 (FIGURE 8) that the logical block 220 delivered orders DC (search of column trunk codes) or orders DR (search of row trunk codes) according to whether one or the other of the flip-flops 213 or 214 was in the 1 state (signal Q1 or Q2).

These flip-flops are controlled by the signals Z5 and Z6 delivered by the zero code decoders 323 and 327 (FIGURE 13) placed in the block 310 and which are respectively associated to the registers 313 (code JC) and 317 (code JR).

It has been seen, during the study of the block of registers 500 of the common control circuit 499, that two codes were transmitted to the marker in the same time as the order D, i.e. either a channel code and a row trunk code or a channel code and a column trunk code. In the first case, a code is stored in the register 317 and the decoder 327 delivers a signal $\overline{Z6}$, and in the second case, a code is stored in the register 313 and the decoder 323 delivers a signal $\overline{Z5}$. These signals are applied respectively to the flip-flops 213 and 214 through the inverters 215 and 216 (FIGURE 8) so that one of these flip-flops sets to the 1 state when a number code is stored in the corresponding register.

The marking of the channel time slot $tD$ is performed in the channel time slot marking circuit 360 (FIGURE 11) in accordance with informations elaborated in the data search common circuit 340 (FIGURE 10).

This operation, which is of the type $Ma$, is performed during the phases DCI and DRI.

The signal 17B, delivered by the OR circuit 299, controls the operation of the circuit 360B and it is supplied by one of the comparators 341 or 345 of the block 340. If one is, for instance, in phase DCI, the channel code in the row trunk stored in the register 311 is compared to the codes transmitted to the block 340 on the conductors 58–2, 56–2, 54–2 connected to the time path store of this row trunk. The appearance of a signal 17B means that both codes are identical and thus that the channel time slot at which this identity holds in the channel time slot $tD$ of connection set up. The outputs of the comparators are applied to the OR circuit 299 through the AND circuits 344 and 347 which are respectively activated in DCI and DRI. The duration of a phase DRI or DCI is thus of one frame period.

The time signal $tD$ appears on the conductor 18y of the circuit 360B (FIGURE 12) in the same manner as a signal $ty$.

The phases DCII and DRII are reserved to the search of the unknown trunk code and, during the phase DCII, a row trunk is selected while, during the phase DRII, many row trunks are selected successively. In the phase DCII the space path store of the row trunk, the code of which is known, is selected and the column trunk codes which are stored therein are transmitted on the conductors 58–4, 56–4, 54–4 to the multiple AND circuit 352 (placed in the block 340) which is activated at the channel time slot $tD$ of this phase DCII. The data search operation which is performed is of the type $Ka$. The code received at this channel time slot is the code of the column trunk connected with the row trunk whose code is known. This result is transferred to the block 310 (FIGURE 13) of the conductor 59–4, and is stored in the register 313 after passage through the multiple OR circuit 314.

The duration of the phase DCII is thus of one frame period.

During the phase DRII, the data search is also carried out by a consultation of column trunk codes, but it is necessary in this case, to examine cyclically the different space path stores since no row trunk code is available. The operation is of the type $Kb$. The cyclic examination is controlled by the row trunk code 40 delivered by the circuit 270 (FIGURE 9). Thus code advances by one position at each time *t*25.5. It is applied to the decoder 487 during the phase DRII (AND circuit 414, placed in the circuit 410), in order to select the corresponding row trunk. The column trunk codes transferred, over the groups of conductors 58–4, 56–4 and 54–4, from the selected space path stores, are applied to the circuit 343. In this circuit, they are compared to the known column trunk code stored in the register 313 (FIGURE 13) which has been transmitted over the group of conductors 53–3.

At each frame period, the code 40 advances by one position and a new space path store is selected and this cyclic examination proceeds up to the time when the comparator 343 (FIGURE 10) delivers a signal on its output. The appearance of this signal means that, at this channel time slot, the column trunk whose code is known is connected with the row trunk whose code is available on the group of conductors 40 during this frame period. The output 28 of the comparator is connected to a first input of the AND circuit 294 which comprises two other inputs receiving the signals DRII and *t*D. If the signal 28 appears when this AND circuit is energized, the selected row trunk is that searched for. The output signal of this AND circuit activates then, through the OR circuit 293, the multiple AND circuit 353 which transmits, on the conductor 59–8, the row trunk code present on its inputs 40 to the OR circuit 318 placed in the block 310 (FIGURE 13) and this code is stored in the register 317.

The duration of a phase DRII is thus at maximum of *n*1 frame periods.

The phases DCIII and DRIII consist in searching for the channel code in the trunk, the code of which has just been found during the phase II. It is an operation of the type K*a*. During this phase, the trunk whose code has just been found is selected and the codes extracted from the time path store of said trunk are applied to a multiple AND circuit which is activated at the channel time slot *t*D (AND circuits 351 and 354). The channel code appearing at this time slot is the searched code and it is transmitted to the block 310 on the groups of conductors 59–2 and 59–6 in order to be stored in the corresponding register (311 or 315).

The duration of one phase DCIII and DRIII is thus of one frame period.

The channel time slot signal *t*D is available on the conductor 18*y* during the three operation phases of the order D. At the appearance of an order H, it is transmitted to the common control circuit in the same way as the signal *ty*.

When the next order is B, the code is returned back to the circuit 360 in the same way as the signal *ty* (logical circuits 579 and 529, FIGURE 13).

One will now study, the data search operations which are performed during the times AII–1, AII–2 and AII–3 of a rearrangement operation.

It has been seen, during the study of FIGURE 5, that one should search in AII–1, for the code of the row trunk R*n*. This search, which is of the type K*b*, is carried out in a manner similar to that performed during the phase DRII.

It has been seen during the description of the circuit 410 (FIGURE 10) that the space path stores were selected during this phase by means of the code 40. It has been seen on the other hand, during the description of the FIGURE 9, that this code advances by one position at each frame period of the time AII–1. The codes extracted from each one of the selected space path stores and transmitted on the group of conductors 54–4 are compared, in the comparator 343 (FIGURE 10), to the code C*o* transmitted from the register 313 (FIGURE 13) on the group of conductors 53–3. When the comparator delivers a signal at a time *tx* (AND circuit 298), this means that the row trunk code which is present at this frame period on the group of conductors 40 is the code R*n*. The output signal G1 of the AND circuit 298 is applied to the generator of rearrangement time signals 280 (FIGURE 9) and it has been seen that this signal controlled the establishment in this circuit, of the time signal AII–2. At this moment, the AND circuit 273 (FIGURE 9) delivers no more signal and the code elaborated in the circuit 270 is no more modified so that the code R*n* is permanently present on the group of conductors 40.

It has been seen, during the study of FIGURE 5, that the generator of row trunk codes 270 (FIGURE 9) delivered the zero code at the beginning of this data search operation. This is made necessary because one is not certain to find a code R*n* and to elaborate a signal G1. If a signal G1 has not appeared after the generator has shown successively the codes of the *n*1 row trunks, said generator delivers the zero code, which control the establishment of the time signal AII–2, as it has been seen during the study of the FIGURE 9.

If a signal G1 is generated, the generator stops on the code R*n* but, since this operation of data search is repetitive (one R*n* code search at each elementary rearrangement operation) and being due to start when said generator shows the zero code, the counter 271 (FIGURE 9) is reset to zero by the logical condition (L +AII–4.*t*20) through the OR circuit 275 (FIGURE 9).

Thus, during a succession of elementary rearrangement operations, the resetting to zero is controlled by the signal AII–4.*t*20 and, as the counter 271 possibly stores a number code following a phase DRII, the resetting to zero is assumed at the beginning of a rearrangement by the order L which precedes the order A.

It has been seen during the study of the FIGURE 5, that several data search operations were performed during the time AII–2. They concern, first, the selection of the code C*p* for storage in the register 334 (FIGURE 10) and second, the first phase of a code permutation.

In order to show up the code C*p*, the store MCS-R*n* is selected in AII–3.*ty*, as it has been seen previously. The codes received on the conductors 58–4, 56–4 and 54–4 are applied to the multiple AND circuit 293 (circuit 340, FIGURE 10) which is activated in AII–2 *ty*. As it has been seen during the study of FIGURE 5, the code arriving at this channel time slot is the code C*p* and it is stored in the register 334 (circuit 310, FIGURE 10).

The first phase of the permutation of the channel codes, as well as the second phase of this operation which has not been described in relation with the other operations of code modification will now be described.

The code permutation consists in extracting in AII–2 (first phase) the codes placed on the lines *x* and *y* of MCT-R*n* and MCT-C*o*, in storing them in the registers 332A, 332B (associated to MCT-R*n* and located in the circuit 310, FIGURES 10 and 13) and 336A, 336B (associated to MCT-R*o* and placed in the circuit 310, FIGURES 10 and 13) and last to transfer them in AII–2 (second phase) respectively on the lines *y* and *x* of the stores from which they have been extracted.

The stores MCT-R*n* and MCT-C*o* are thus selected, as it has been seen previously in AII–2 and AII–3 (logical circuits 415, 414, 421 for MCT-R*n* and 423, 413 for MCT-C*o*).

The data searches for the first phase of the permutation are of the type K*a*. The selection of the channel codes is carried out by the activation of the multiple AND circuits 291, 297 activated in AII–2.*tx*, and 292, 296 activated in AII–2.*ty* (circuit 340, FIGURE 10) and the selected codes are stored in the registers mentioned previously.

The operations which are performed during this first phase are the following:

The code (R*n*–C*p*) located on the line *y* of MCT-R*n* is transmitted to the multiple AND circuit 292 on the group of conductors 54–2, and is stored in the register 332B (FIGURE 13);

The code (R*n*–C*o*) located on the line *x* of MCT-R*n* is transmitted to the multiple AND circuit 291 on the group of conductors 54-2, and is stored in the register 332A (FIGURE 10);

The code (Ro–C̲o̲) located on the line y of MCT–Co is transmitted to the multiple AND circuit 296 on the group of conductors 54-6, and is stored in the register 336B (FIGURE 13);

The code (Rn–C̲o̲) located on the line x of MCT–Co is transmitted to the multiple AND circuit 297 on the group of conductors 54-6, and is stored in the register 336A (FIGURE 10).

The operations which are performed during the second phase of the permutation of the channel codes are controlled by the multiple AND circuits 441, 445 activated in AII–3.tx and 442, 444 activated in AII–3.ty. These AND circuits are located in the code modification circuit 430 (FIGURE 10). These operations are the following:

The code R̲n̲–Cp) stored in the register 332B is transmitted to the multiple AND circuit 441 on the group of conductors 49-1 and is stored on the line x of MCT–Rn;

The code (R̲n̲–Co) stored in the register 332A is transmitted to the multiple AND circuit 442 on the group of conductors 48-1 and is stored on the line y of MCT–Rn;

The code (Ro–C̲o̲) stored in the register 336B is transmitted to the multiple AND circuit 445 on the group of conductors 49-5 and is stored on the line x of MCT–Co;

The code (Rn–C̲o̲) stored in the register 336A is transmitted to the multiple AND circuit 444 on the group of conductors 48-5 and is stored on the line y of MCT–Co.

The duration of the times AII–2 and AII–3 is of one frame period.

The operations carried out during the time AII–4 concern the end of a rearrangement operation and either the preparation of the following rearrangement operation or, after the detection of one of the criterions of end of rearrangement, the shifting to the phase AIII (elaboration of the signal F) characterizing the end of the operations of setting up of the connection (Ro–Co).

The performance of these operations has been explained during the study of the FIGURE 5 and one shall only describe the used circuits. The time AII–4 starts at the latest in t25-4 (see description of the FIGURES 8 and 9).

It has been seen during the study of the selection order distributor 410 (FIGURE 10) that the codes of the connection (Rn–Cp) which must be set up by the connection by-pass circuit 390 (FIGURE 12) were stored in the registers 420 and 427 (FIGURE 10) in 4.t25.8 (digit time slot t25.8 of the time AII–4). This connection thus flows through the circuit 390 from the first frame period following the setting up of the time AII–4. It has been seen, during the study of FIGURE 5, that this allowed the uninterrupted flow of the data related to the connection (Rn–Cp).

In the next rearrangement operation, this connection behaves like a new connection to be set up (Ro–Co) and will thus be set up through the switch 100 (FIGURE 2) starting from the time AII–4 of this operation. Therefore, the registers 420 and 427 are reset to zero in 4.t25.3.

The second operation of this time AII–4 consists first to reset to zero, in 4.t8, the registers 317 and 313 of the block 310 (FIGURE 13) through the OR circuits 318 and 319 in order to transfer therein the codes Rn and Cp of the new connection to be set up. The code Rn, available on the group of conductors 40, is transferred in the register 317 by the activation, in AII–4.t10, of the multiple AND circuit 353 through the OR circuit 295 (FIGURE 10). The code Cp, which is stored in the register 334 (block 310, FIGURE 10), is transferred in the register 313 by the activation, in AII–4.t10, of the multiple AND circuit 335 and the register is cleared at the time AII–4.t15.

Last, the third operation of this time AII–4 consists in detecting either one or both criterions of end of rearrangement. It has been seen, during the study of FIGURE 5, that this operation consisted in determining if at least one of the registers 313 or 317 contained a zero code after the code transfer operation which has just been described. One uses for that, the zero code detectors 327 and 323 associated respectively to the registers 317 and 313 which deliver a signal Z6 or Z5 if a zero code is written in the associated register.

It has been seen, during the study of the time control circuit 210 (FIGURE 8) that the OR circuit 221 delivered a signal for the logical condition (Z5 + Z6) that this signal was transmitted in AII–4.t15 to the OR circuit 231 in order that the counter 211 advances by one position and that the logical block delivers a signal F. The signal 4.t15 clears also the registers 332A, 332B, 336A, 336B (FIGURES 10 and 13). It will be reminded that, when an end of rearrangement criterion has not been detected, the phase AII starts again (description of FIGURE 9) with a Rn code search by means of the generator of row codes which has just been reset to zero in AII–4.t20. The operations performed under the control of each of the order signals having been described, one will give now the succession of order signals delivered by the common control circuit to the marker stage, in two classical cases of telephone exploitation.

In the case of the setting up of a connection one will assume, for instance, that a calling subscriber, which has access to a switching stage through a channel VC of an incoming trunk JC (connected for instance to a column of the switch), has transmitted to a call register the number of the called subscriber. The codes JC and VC are then transferred to the common control circuit and are stored in the register 523 and 525 (FIGURE 13) with a service information indicating the aim for which all these informations have been gathered in the common control circuit, i.e. the setting up of a connection towards a called subscriber.

After consulting an associated circuit, the common control circuit determines, from the number of the called subscriber, an outgoing trunk JR having access to the called subscriber and, as soon as it possesses this information, it stores it in the register 517 and elaborates successively the following orders:

L (clearing of the marker);

Co and C (free channel search on the trunk JR).

After reception of the signal F indicating the end of the operation C, the common control circuit transmits an order H to the marker. Two cases may then occur, according to whether a signal 26C or a signal 26L is stored in the circuit 380 (FIGURE 12):

The logical block 560 receives a signal 26C indicating that no free channel at all has been found on the trunk JR. The common control circuit may then either control a new operation C on another outgoing trunk giving access to the called subscriber, or control the sending, to the calling subscriber, of a "busy signal" indicating that the communication cannot be set up.

The logical block 560 receives a signal 26L indicating that a free channel has been found and that its code has been stored in the corresponding register (register 311 in the case of the example). It elaborates then successively, the following orders:

L (clearing of the marker);

Eo and E (search of free channel time slots for the setting up of the connection).

After reception of the signal F which indicates the end of the operation E, the common control circuit transmits an order H to the marker stage. The block 560 elaborates then successively the following orders:

L ( clearing of the marker);

Ao and A (data inscription). After reception of the signal F, it either sends or not an order H to the marking stage.

In the case of the breaking of a connection, the common control circuit receives, from an associated circuit, informations made up, for instance, by the code of a column trunk JC and the code of a channel VC on this trunk as well as a service information indicating to the common control circuit that the connection set up with the channel VC of that trunk JC must be broken. The mentioned associated circuit may be constituted, for instance, by a circuit which explores the channels of the different trunks and detects the arrival of a particular code meaning that a traffic connection must be broken. It can also be a circuit delivering to the common control circuit the information that a service connection must be broken. As soon as this information is received, the common control circuit controls the following operation:

L (clearing of the marker circuit);
Do and D (path identification).

After reception of the signal F characterzing the end of the operation, it transmits to the marker stage the orders:

H (transfer of the information obtained during the operation);
L (clearing of the marker circuit);
B (inscription of the zero code in the path stores at the addresses where the trunk and channel codes characterizing the connection which must be interrupted were written).

The common control circuit has been described only for explaining how the marker stage operates in some simple cases of telephone exploitation. However it will be understood that, in a telephone exchange, such a circuit would have other functions and that systems can be imagined wherein the same marker stage associated to an identical switching stage would receive from the common control circuit a more complex succession of orders than that described in the case of the setting up or of the cutting off of a connection. However such a description is out of the scope of the present invention.

While the principles of the above invention have been described in connection with specific embodiments and particular modifications thereof it is to be clearly understood that this description is made by way of example and not as a limitation of the scope of the invention.

What we claim is:

1. An electronic switching telephone system comprising a plurality of time division multiplex highways, each highway having synchronized recurring time slots for forming communication channels, an incoming buffer memory means and an outgoing buffer memory means associated with each of said highways, a time controlled path storage memory means for selectively operating said incoming and outgoing memory means during first and second halves of said time slots whereby communication is extended in one direction during a first half of each time slot and in an opposite direction during a second half of each time slot, means responsive to said path storage means for selectively coupling the incoming memory on one of said highways to the outgoing memory on another of said highways during a half of each recurring time slot committed to serve a particular call, means responsive to said path storage means for selectively coupling the outgoing memory on said one highway to the incoming memory on said other highway during the other half of each recurring time slot committed to serve said particular call, and means responsive to a blocked call condition for rearranging existing paths to remove said condition.

2. The system of claim 1 and a common control means having a register for storing data relative to said one and said other highways, a channel on one of said highways, and particular time slots on each of said highways committed to serve said call; means responsive to the complete storage of all data in said register for establishing a speech path; and means responsive to the storage of less than all of said data for causing a search to discover data for completing the storage of all said data in said register.

3. The system of claim 2 and an order means for commanding different operations responsive to the data stored in said register; and means responsive to said order means for selectively accessing said path storage means, said search means, or means for completing the storage of said data in said register.

4. The system of claim 1 and an order means for issuing signals commanding the system to perform a series of operations depending upon the requirements of the system at any particular time, means responsive to one of said command signals for conducting a search for a free channel on a particular trunk and for writing the code of the trunk in said path storage memory means, means in said path storage memory means for delivering a signal during each idle time slot, and means for sending a busy signal if there are no idle time slots.

5. The system of claim 4 and counter means for storing data which identifies particular time slots at random, said counter advancing once for each frame of time slots, means for comparing codes read out by said path storage memory means with the randomly identified time slot means for giving an equality signal when said comparing means finds an equality between an idle time slot and said randomly identified time slot, and means responsive to said equality signal for writing the identification of said random time slot into storage as a free channel.

6. A time division multiplex telephone switching system comprising a plurality of highways each having a pair of buffer memory storage devices coupled to the end thereof, a space division matrix of time division gates for selectively interconnecting said pairs of buffer storage devices during preselected time channels, thereby interconnecting the different highways associated with the interconnected pairs of said storage devices, means responsive to internal blocking in said matrix for searching for a free channel on each of two highways, and means responsive to said searching means for modifying said interconnections to suppress said internal blocking and establish said blocked connections.

7. The system of claim 6 and means effective during said modification for carrying out code transfer and connection by-pass operations.

8. The system of claim 6 and common control means for controlling the modification of said interconnections, said common control means comprising means for selectively ordering a free channel search, and path and channel identification.

9. The system of claim 6 and a by-pass circuit external to said matrix, and means for extending at least one connection through said by-pass circuit while said interconnections are being modified in said matrix.

10. The system of claim 9 wherein said by-pass circuit is coupled between an input and an output of said matrix.

11. A pulse code modulation telephone switching system comprising a plurality of time division highways interconnected by a space division network of time controlled gate circuits, means responsive to internal blocking in said network for determining whether a free channel exists on a called highway, means responsive to detection of a free channel for storing data relative to a call, means responsive to said stored data for undertaking a rearrangement cycle to rearrange connections in said network, and means for establishing a connection through a by-pass circuit for the duration of a rearrangement cycle.

References Cited by the Examiner
UNITED STATES PATENTS

| | | | |
|---|---|---|---|
| 3,049,593 | 8/1962 | Touraton et al. | 179—15 |
| 3,050,589 | 8/1962 | Vaughan | 179—18.9 |
| 3,090,836 | 5/1963 | Bezdel | 179—15 |
| 3,112,369 | 11/1963 | Sparrendahl | 179—15 |

DAVID G. REDINBAUGH, *Primary Examiner.*

T. G. KEOUGH, R. L. GRIFFIN, *Assistant Examiners.*